United States Patent
Abe et al.

(10) Patent No.: US 11,256,154 B2
(45) Date of Patent: Feb. 22, 2022

(54) OPTICAL MODULATOR AND OPTICAL TRANSMISSION MODULE

(71) Applicant: Mitsubishi Electric Corporation, Tokyo (JP)

(72) Inventors: Kenichi Abe, Tokyo (JP); Shusaku Hayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/049,035

(22) PCT Filed: Apr. 1, 2019

(86) PCT No.: PCT/JP2019/014514
§ 371 (c)(1),
(2) Date: Oct. 20, 2020

(87) PCT Pub. No.: WO2019/239683
PCT Pub. Date: Dec. 19, 2019

(65) Prior Publication Data
US 2021/0240049 A1    Aug. 5, 2021

(30) Foreign Application Priority Data
Jun. 14, 2018 (JP) .............................. JP2018-113247

(51) Int. Cl.
*G02F 1/21*     (2006.01)
*G02F 1/225*    (2006.01)

(52) U.S. Cl.
CPC ............ *G02F 1/212* (2021.01); *G02F 1/2255* (2013.01)

(58) Field of Classification Search
CPC ...... G02F 1/0147; G02F 1/0123; G02F 1/212; G02F 1/225; G02F 1/2255; G02F 1/2257;
(Continued)

(56) References Cited

U.S. PATENT DOCUMENTS 6,522,793 B1    2/2003  Szilagyi et al.
6,535,320 B1 *  3/2003  Burns .................... G02F 1/2255
                                                   356/477

(Continued)

FOREIGN PATENT DOCUMENTS

JP    2014-89310 A    5/2014
JP    2014-112219 A   6/2014
(Continued)

OTHER PUBLICATIONS

International Search Report and Written Opinion dated Jun. 25, 2019 for PCT/JP2019/014514 filed on Apr. 1, 2019, 14 pages including English Translation of the International Search Report.
(Continued)

*Primary Examiner* — Michael P Mooney
(74) *Attorney, Agent, or Firm* — Xsensus LLP

(57) ABSTRACT

An optical modulator includes a plurality of Mach-Zehnder optical modulation units. Each of the plurality of Mach-Zehnder optical modulation units include a pair of first signal wirings, a pair of first ground wirings, a pair of first signal electrode pads, and a pair of first ground electrode pads. The pair of first ground electrode pads is displaced by less than the first interval from the pair of first signal electrode pads so as to separate from a center line of each of the plurality of Mach-Zehnder optical modulation units.

15 Claims, 11 Drawing Sheets

(58) Field of Classification Search
CPC ... G02B 6/12007; G02B 6/1228; G02B 6/125
USPC ........................................ 385/1–3, 14, 92–94
See application file for complete search history.

(56) References Cited

U.S. PATENT DOCUMENTS

| | | | |
|---|---|---|---|
| 7,526,161 B2* | 4/2009 | Ishii ................... | G02B 6/1228 |
| | | | 385/2 |
| 8,818,142 B2* | 8/2014 | Hayakawa ............ | G02F 1/2257 |
| | | | 385/3 |
| 9,448,457 B2* | 9/2016 | Itou .................... | H04B 10/5053 |
| 2004/0240765 A1* | 12/2004 | Wooten ................. | G02F 1/225 |
| | | | 385/2 |
| 2010/0245968 A1* | 9/2010 | Smith .................. | G02F 1/0123 |
| | | | 359/239 |
| 2011/0158576 A1* | 6/2011 | Kissa .................. | G02F 1/225 |
| | | | 385/3 |
| 2013/0209021 A1* | 8/2013 | Hayashi ............... | G02F 1/225 |
| | | | 385/2 |
| 2014/0119686 A1 | 5/2014 | Sugiyama | |
| 2014/0133794 A1 | 5/2014 | Kono | |
| 2015/0117869 A1* | 4/2015 | Wakayama ........ | H04B 10/5055 |
| | | | 398/185 |
| 2015/0277159 A1 | 10/2015 | Fujikata et al. | |
| 2015/0286108 A1* | 10/2015 | Prosyk ................. | G02F 1/0123 |
| | | | 385/3 |
| 2015/0293427 A1 | 10/2015 | Goi et al. | |
| 2017/0070297 A1* | 3/2017 | Park ..................... | G02F 1/2257 |
| 2017/0194308 A1 | 7/2017 | Evans et al. | |

FOREIGN PATENT DOCUMENTS

| | | |
|---|---|---|
| JP | 2015-191069 A | 11/2015 |
| JP | 2017-16020 A | 1/2017 |
| JP | 2017-181851 A | 10/2017 |
| WO | 2014/104309 A1 | 7/2014 |

OTHER PUBLICATIONS

Notice of Reasons for Refusal received for Japanese Patent Application No. 2019-552302, dated Dec. 17, 2019, 23 pages including English Translation.
Notice of Reasons for Refusal received for Japanese Patent Application No. 2019-552302, dated Mar. 17, 2020, 10 pages including English Translation.

* cited by examiner

OPTICAL MODULATOR AND OPTICAL TRANSMISSION MODULE

CROSS-REFERENCE TO RELATED APPLICATIONS

The present application is based on PCT filing PCT/JP2019/014514, filed Apr. 1, 2019, which claims priority from JP 2018-113247, filed Jun. 14, 2018, the entire contents of each are incorporated herein by reference.

TECHNICAL FIELD

The present invention relates to an optical modulator and an optical transmission module.

BACKGROUND ART

In recent years, there is a demand for an optical transmission module capable of transmitting a large-capacity optical signal by performing polarization multiplexing and multilevel phase modulation of the optical signal in order to deal with speed enhancement of optical communication associated with a dramatic increase in communication demand. An optical transmission module including an optical modulator in which a plurality of Mach-Zehnder optical modulation units are integrated is studied in order to enable the transmission of the large-capacity optical signal.

Japanese Patent Laying-Open No. 2014-112219 (PTL 1) discloses an optical module including an optical integrated device. The optical module includes the plurality of Mach-Zehnder optical modulation units arranged in parallel and a signal line through which an electric signal input to the Mach-Zehnder optical modulation unit is propagated. In the optical integrated device, wire bonding electrode pads electrically connected to the signal line are arranged in a line along a short side of the optical integrated device. The short side of the integrated optical element extends in a direction perpendicular to a direction in which an optical waveguide and the signal line extend.

Japanese Patent Laying-Open No. 2014-89310 (PTL 2) discloses an optical transmitter including an optical modulator. The optical modulator includes a plurality of Mach-Zehnder optical modulation units arranged in parallel and a signal line through which the electric signal input to the Mach-Zehnder optical modulator is propagated. In the optical modulator, the signal line includes a first portion extending in a direction in which the optical waveguide of the Mach-Zehnder optical modulation unit extends and a second portion extending in a direction perpendicular to the direction in which the optical waveguide extends. The second portion of the signal line is electrically connected to a flexible circuit board on a long side of the optical modulator extending in the direction in which the optical waveguide extends.

CITATION LIST

Patent Literature

PTL 1: Japanese Patent Laying-Open No. 2014-112219
PTL 2: Japanese Patent Laying-Open No. 2014-89310

SUMMARY OF INVENTION

Technical Problem

However, in the optical integrated device disclosed in PTL 1, the wire bonding electrode pads are arranged in a line along the short side of the optical integrated device. Consequently, in the short-side direction of the optical integrated device, a size of the wire bonding electrode pad becomes larger than a size of the Mach-Zehnder optical modulation unit, which prevents downsizing of the optical integrated device. In particular, in order to input and output the high-frequency electric signal to and from the optical integrated device, it is necessary to decrease inductance of the bonding wire. In order to decrease the inductance of the bonding wire, it is necessary to use the bonding wire having a larger diameter. For this reason, the wire bonding electrode pad is also enlarged, and downsizing of the Mach-Zehnder optical modulator is prevented.

On the other hand, because the optical modulator disclosed in PTL 2 is electrically connected to the flexible circuit board along the long side of the optical modulator, a width of the electrode pad has a little bad influence on the downsizing of the Mach-Zehnder optical modulator. However, each signal line is bent at right angles. A difference between a path length of the inside signal line and a path length of the outer signal line increases. A skew difference between the input and output electric signals increases between the inside signal line and the outside signal line. A return loss of the electric signal increases. Consequently, there is a problem in that a frequency response characteristic of the electric signal is degraded.

The present invention has been made to solve these problems, and an object of the present invention is to provide an optical modulator and an optical transmission module, in which the frequency response characteristics of the input and output electric signals can be improved and the downsizing can be performed.

Solution to Problem

According to one aspect of the present invention, an optical modulator includes a plurality of Mach-Zehnder optical modulation units. Each of the plurality of Mach-Zehnder optical modulation units includes a pair of first signal wirings, a pair of first signal electrode pads, a pair of first ground wirings, and a pair of first ground electrode pads. Each of the pair of first signal wirings includes a pair of first signal wiring portions and a pair of second signal wiring portions connected to one ends of the pair of first signal wiring portions. The pair of second signal wiring portions extends from one ends of the pair of first signal wiring portions so as to separate gradually in a second direction from a center line in the second direction of each of the plurality of Mach-Zehnder optical modulation units with a distance from the pair of first signal wiring portions in the first direction increases. The pair of first signal electrode pads is connected to the pair of second signal wiring portions. The pair of first ground electrode pads is located close to the pair of first signal electrode pads, and connected to the pair of first ground wirings. The pair of first ground electrode pads is displaced by less than a first interval from the pair of first signal electrode pads so as to separate from the center line of each of the Mach-Zehnder optical modulation units. The first interval is an interval between centers of the pair of first signal electrode pads.

An optical transmission module of the present invention includes the modulator.

Advantageous Effects of Invention

Thus, in each of the plurality of Mach-Zehnder optical modulation units, the pair of first ground electrode pads is displaced by less than the first interval from the pair of first signal electrode pads so as to separate from the center line of each of the plurality of Mach-Zehnder optical modulation units. Therefore, the optical modulator and the optical transmission module can be downsized. Additionally, the pair of second signal wiring portions extends from one ends of the pair of first signal wiring portions so as to separate gradually in the second direction from the center line in the second direction of each of the plurality of Mach-Zehnder optical modulation units with the distance from the pair of first signal wiring portions in the first direction increases. Therefore, the return loss of the electric signal decreases in the first signal wiring. Therefore, the frequency response characteristic of the electric signal is improved in the optical modulator.

DESCRIPTION OF EMBODIMENTS

Figure 1:
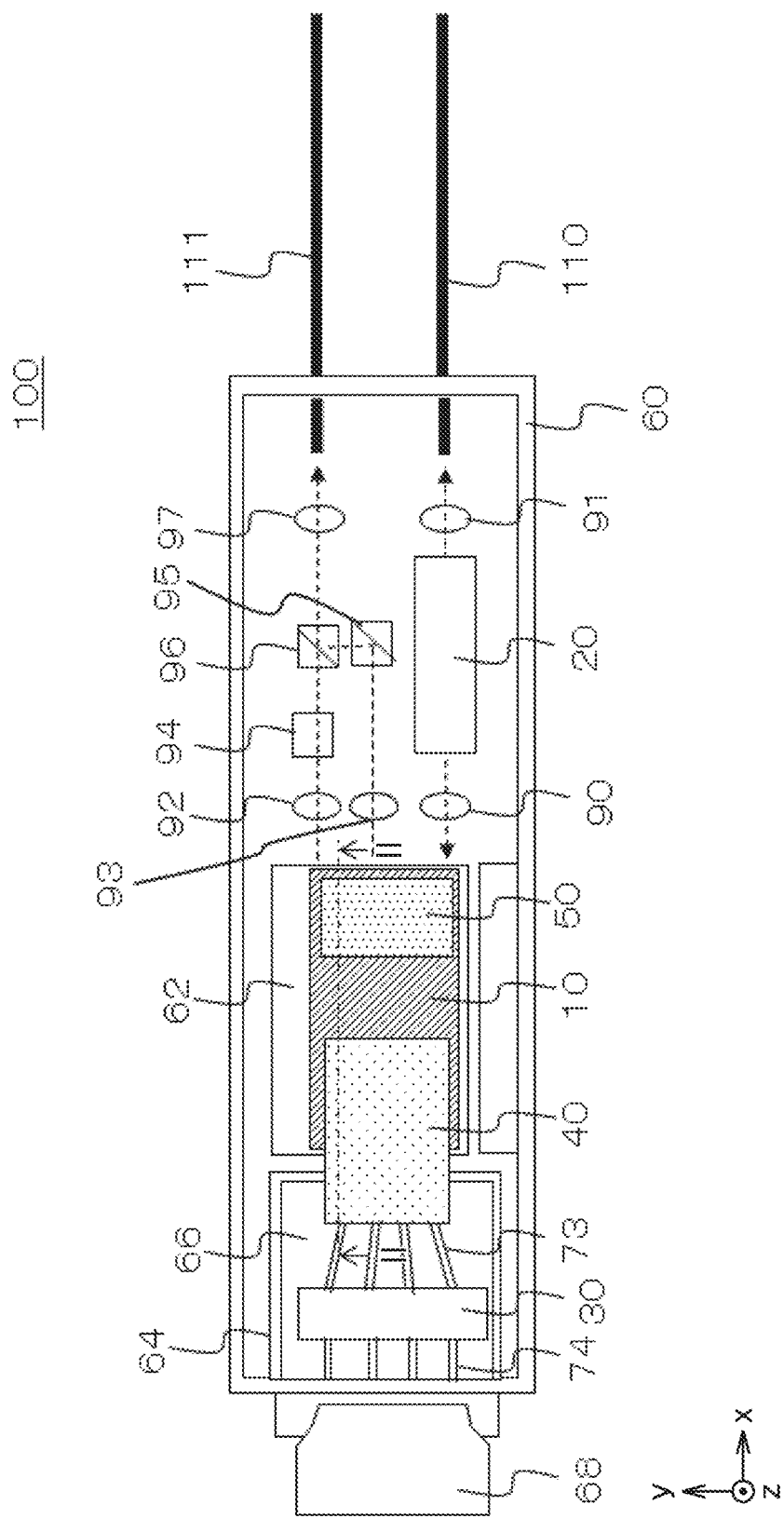
FIG. 1 is a schematic plan view illustrating an optical transmission module according to a first embodiment.

Hereinafter, embodiment of the present invention will be described with reference to the drawings. The drawings are schematic, and conceptually explain a function or a structure. The present invention is not limited to the following embodiments. A basic configuration of an optical transmission module is common to all the embodiments, unless otherwise specified. The same components are designated by the same reference numerals, and the overlapping description will be omitted.

First Embodiment

Figure 2:
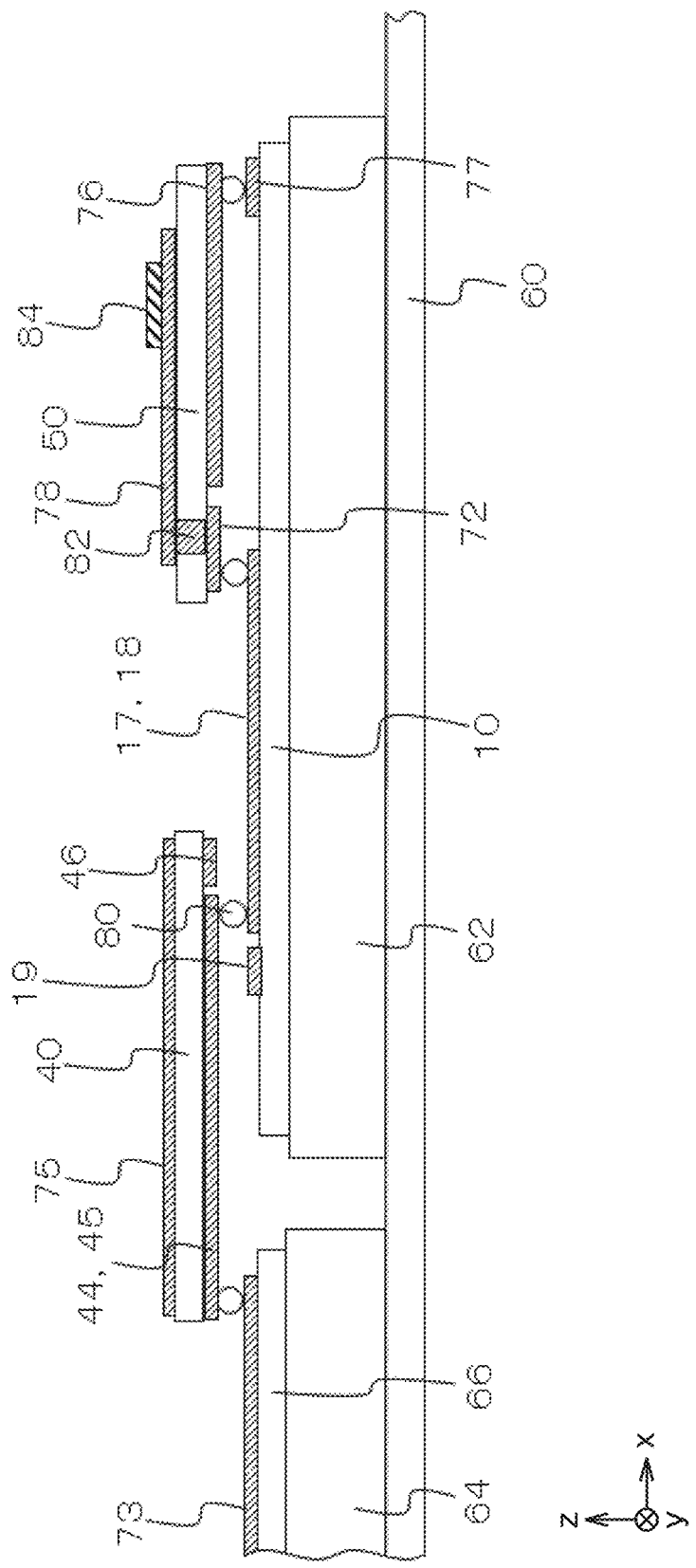
FIG. 2 is a schematic partially enlarged sectional view illustrating the optical transmission module pf the first embodiment, taken along line II-II in FIG. 1.

Referring to FIGS. 1 and 2, an optical transmission module 100 according to a first embodiment will be described. Optical transmission module 100 mainly includes an optical modulator 10, a CW (Continuous Wave) laser 20, a driver IC 30, a wiring board 40, and a terminal board 50.

As illustrated in FIG. 2, optical modulator 10 is disposed on a chip carrier 62. Chip carrier 62 is provided on a bottom plate of a package 60. Signal wirings 17, 18 and a ground wiring 19 are provided on an upper surface of optical modulator 10. Signal wirings 17, 18 are electrically connected to signal wirings 44, 45 and a signal wiring 72 through bumps 80. Signal wirings 44, 45 are provided on a lower surface of wiring board 40. Signal wiring 72 is provided on a lower surface of terminal board 50. Detailed optical modulator 10 will be described later.

As illustrated in FIG. 1, CW laser 20 is provided in package 60. For example, CW laser 20 is a semiconductor laser. CW laser 20 can emit CW light in the left and right directions in FIG. 1 that is a plan view of optical transmission module 100. A lens 90 can collect the CW light emitted leftward from CW laser 20. Lens 91 can collect the CW light emitted rightward from CW laser 20.

Lens 90 causes the CW light to enter an incident port 11 (see FIG. 3) of optical modulator 10. Lens 91 causes the CW light to enter an optical fiber 110. The CW light is output to an outside of optical transmission module 100 through optical fiber 110.

As illustrated in FIGS. 1 and 2, driver IC 30 is disposed on wiring board 66. Wiring board 66 is provided on a field through 64 constructed with, for example, a ceramic board. Field through 64 is provided on a bottom plate of package 60. Field through 64 extends through a sidewall of package 60 from an inside of package 60 to an outside of package 60. Field through 64 is connected to a flexible board 68 on the outside of package 60. Wirings 73, 74 are provided on the upper surface of wiring board 66. Wirings 73, 74 are electrically connected to driver IC 30. Driver IC 30 is electrically connected to a wiring (not illustrated) provided on flexible board 68 through wiring 74 and a wiring (not illustrated) provided on field through 64. In this way, a control signal is input from flexible board 68 to driver IC 30.

As illustrated in FIG. 2, wiring board 40 is provided above optical modulator 10 and wiring board 66 through bump 80. Bump 80 has conductivity, and is, for example, a solder ball. Signal wirings 44, 45 and a ground wiring 46 are provided on the lower surface of wiring board 40. Signal wirings 44, 45 electrically connect wiring 73 of wiring board 66 and signal wirings 17, 18 of optical modulator 10 through bumps 80. A ground wiring 75 is provided on the upper surface of wiring board 40. Ground wiring 75 is electrically connected to ground wiring 46 provided on the lower surface of wiring board 40 through a via electrode (not illustrated) penetrating wiring board 40. Detailed wiring board 40 will be described later.

As illustrated in FIG. 2, terminal board 50 is provided on optical modulator 10. Signal wiring 72 and a ground wiring 76 are provided on the lower surface of terminal board 50. Signal wiring 72 is electrically connected to signal wirings 17, 18 provided on the upper surface of optical modulator 10 through bumps 80. Ground wiring 76 is electrically connected to a ground wiring 77 provided on the upper surface of optical modulator 10 through bump 80. A signal wiring 78 is provided on the upper surface of terminal board 50. Signal wiring 72 and signal wiring 78 are electrically connected to each other by a via electrode 82 penetrating terminal board 50. A terminal resistor 84 is provided on signal wiring 78. Terminal resistor 84 is electrically connected to signal wiring 78. Terminal resistor 84 can terminate a differential signal that is the control signal input to optical modulator 10.

As illustrated in FIG. 1, optical transmission module 100 further includes lenses 92, 93, a wave plate 94, a mirror 95, a polarization beam splitter 96, a lens 97, and an optical fiber 111. Lenses 92, 93 shape an optical signal, which is output from optical modulator 10, into parallel light. Wave plate 94 rotates a polarized wave of the optical signal shaped by lens 92 by 90 degrees. Mirror 95 reflects the optical signal shaped by lens 93. Polarization beam splitter 96 multiplexes the optical signal output from wave plate 94 and the optical signal reflected by mirror 95. Lens 97 collects the optical signal multiplexed by polarization beam splitter 96. The optical signal collected by lens 97 is output to the outside of optical transmission module 100 through optical fiber 111. In this way, optical transmission module 100 is constructed.

Figure 3:
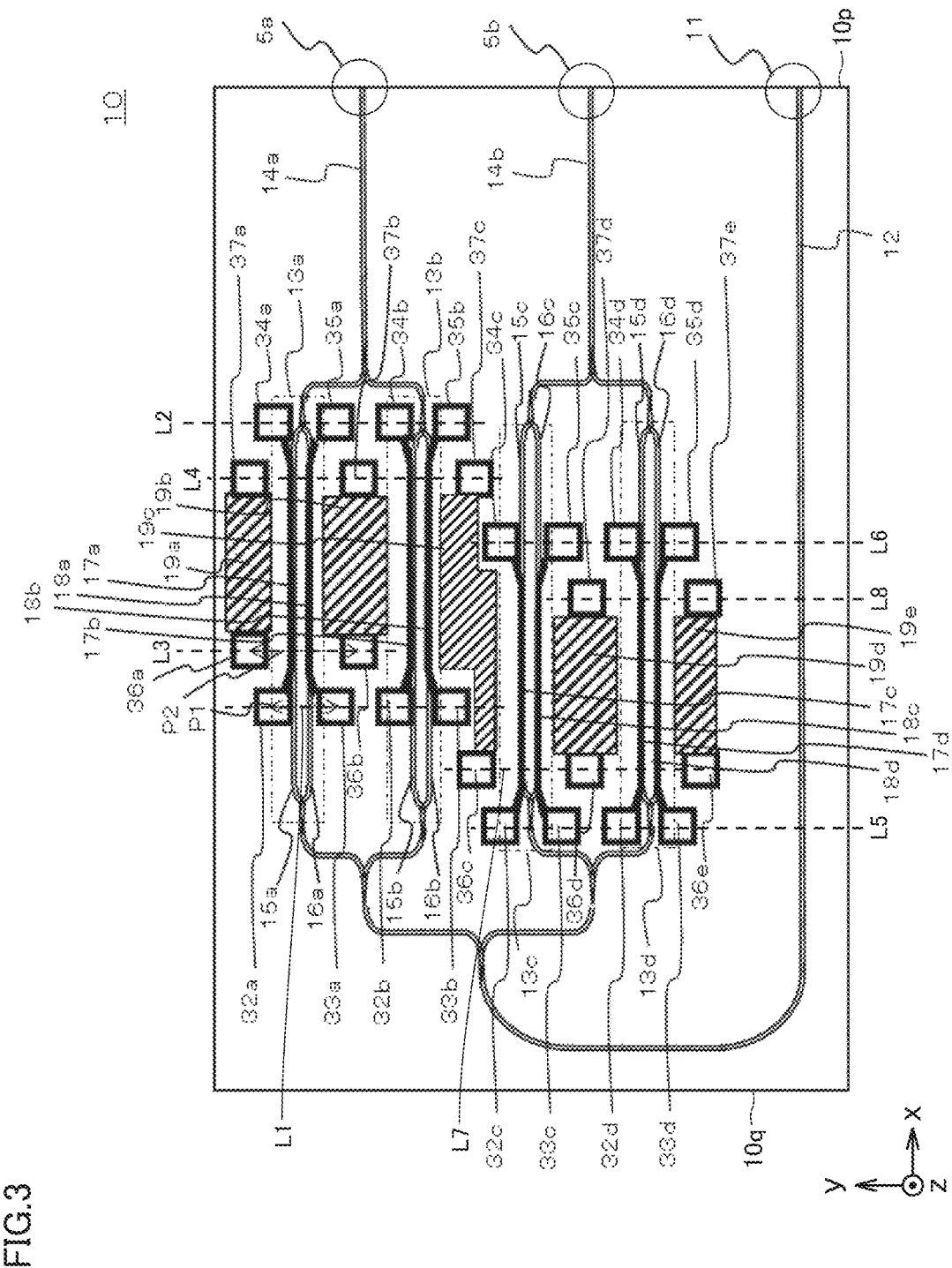
FIG. 3 is a schematic plan view illustrating an optical modulator of the first embodiment.
Figure 4:
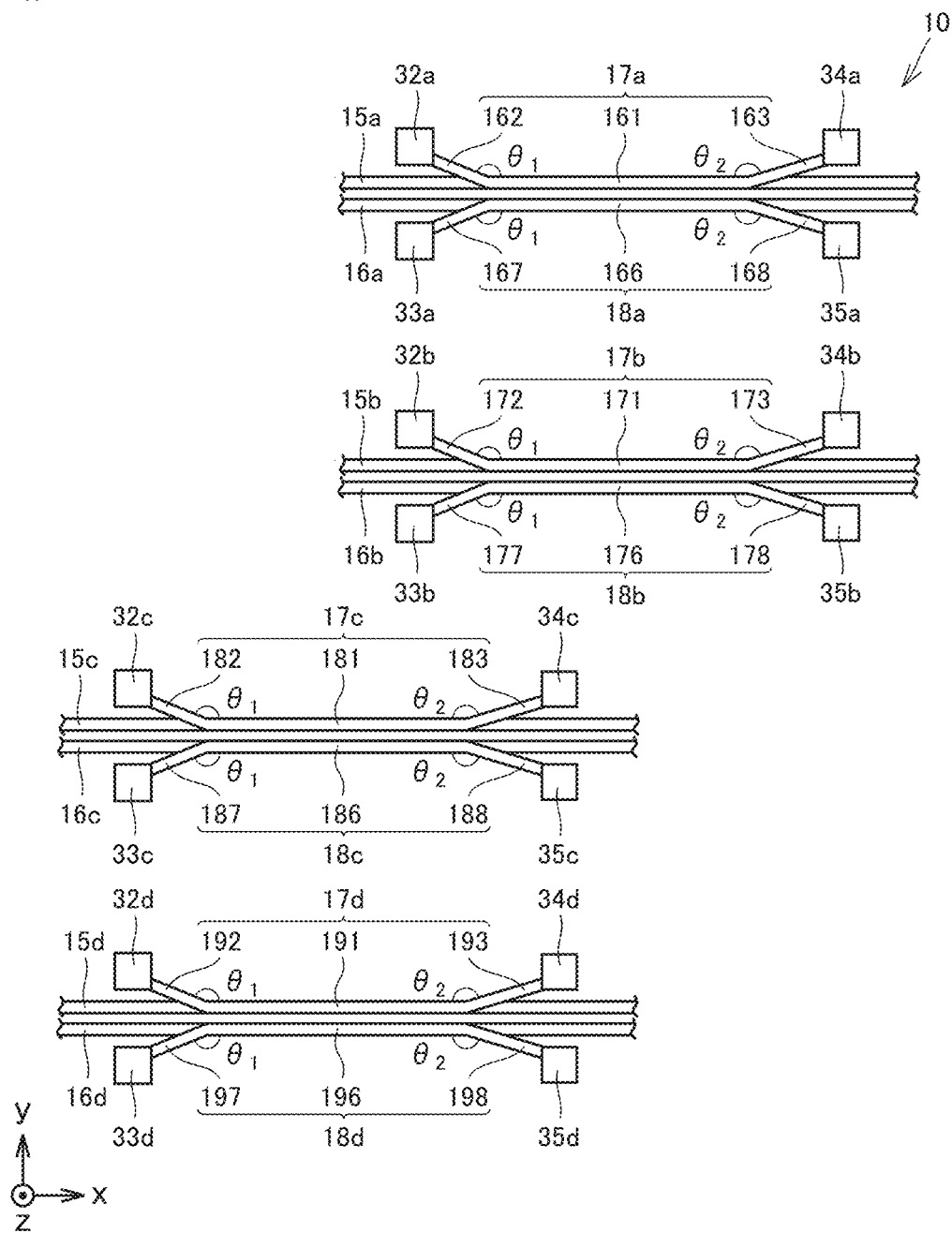
FIG. 4 is a schematic enlarged plan view illustrating a signal wiring and an electrode pad corresponding to the signal wiring in the optical modulator of the first embodiment.

Referring to FIGS. 3 and 4, optical modulator 10 of the first embodiment will be described in detail. Hereinafter, a direction in which arm waveguides 15a to 15d, 16a to 16d of optical modulator 10 extend, namely, a left-right direction in planar view of optical transmission module 100 is defined as a first direction (x-direction) or a horizontal direction. A direction perpendicular to the direction in which arm waveguides 15a to 15d, 16a to 16d of optical modulator 10 extend, namely, a vertical direction in planar view of optical transmission module 100 is defined as a second direction (y-direction) or a vertical direction.

Optical modulator 10 is made of a semiconductor material such as InP. Optical modulator 10 includes incident port 11, an input optical waveguide 12, a plurality of optical modulation units 13a to 13d, output optical waveguides 14a, 14b, and outgoing ports 5a, 5b. A laser beam emitted from CW laser 20 is incident on incident port 11 through lens 90. The CW light incident from incident port 11 is propagated through input optical waveguide 12 as the optical signal. The optical signal propagated through input optical waveguide 12 is input to the plurality of optical modulation units 13a to 13d. The plurality of optical modulation units 13a to 13d modulate the optical signal. The optical signals modulated by the plurality of optical modulation units 13a to 13d are propagated through output optical waveguides 14a, 14b. The optical signals propagated through output optical waveguides 14a, 14b are output from outgoing ports 5a, 5b.

Incident port 11 is provided in a first short side 10p of optical modulator 10. First short side 10p of optical modulator 10 extends in the second direction (the y-direction). The CW light emitted from CW laser 20 is incident on input optical waveguide 12 through incident port 11.

Input optical waveguide 12 extends in the horizontal direction (the first direction, the x-direction) from incident port 11. Input optical waveguide 12 is bent by 180° in a vicinity of a second short side 10q on an opposite side to a first short side 10p in which incident port 11 is provided. Input optical waveguide 12 branches into four optical waveguides. The four branched optical waveguides are connected to optical modulation units 13a to 13d, respectively. Specifically, input optical waveguide 12 includes a first 1×2 branch waveguide, a second 1×2 branch waveguide, and a third 1×2 branch waveguide. As used herein, the 1×2 branch waveguide means a branch waveguide including one input unit and two output units. The two output units of the first 1×2 branch waveguide are connected to optical modulation unit 13a and optical modulation unit 13b, respectively. The two output units of the second 1×2 branch waveguide are connected to optical modulation unit 13c and optical modulation unit 13d, respectively. The two outputs of the third 1×2 branch waveguide are connected to one input unit of the first 1×2 branch waveguide and one input unit of the second 1×2 branch waveguide, respectively. The light incident from incident port 11 is incident on one input unit of the third 1×2 branch waveguide. In this way, the CW light incident from incident port 11 is propagated through optical modulation units 13a to 13d as the optical signal.

Each of the plurality of optical modulation units 13a to 13d is a Mach-Zehnder optical modulator. The plurality of optical modulation units 13a to 13d are arrayed in the vertical direction (the second direction, the y-direction). Specifically, the plurality of optical modulation units 13a, 13b are arrayed in the vertical direction (the second direction, the y-direction). The plurality of optical modulation units 13c, 13d are arrayed in the vertical direction (the second direction, the y-direction). The plurality of optical modulation units 13c, 13d are displaced in the horizontal direction (the first direction, the x-direction) with respect to the plurality of optical modulation units 13a, 13b. In the horizontal direction (the first direction, the x-direction), a part of the plurality of optical modulation units 13c, 13d overlaps the plurality of optical modulation units 13a, 13b.

The plurality of optical modulation units 13a to 13d include pairs of arm waveguides 15a to 15d, 16a to 16d and pairs of signal wirings 17a to 17d, 18a to 18d, respectively. The pairs of arm waveguides 15a to 15d, 16a to 16d extend in the horizontal direction (the first direction, the x-direction). The pairs of arm waveguides 15a to 15d, 16a to 16d are opposed to each other in the vertical direction (the second direction, the y-direction). One ends of the pairs of arm waveguides 15a to 15d, 16a to 16d are connected to branched input optical waveguide 12. The other ends of the pairs of arm waveguides 15a to 15d, 16a to 16d are connected to output optical waveguides 14a, 14b.

The pairs of signal wirings 17a to 17d, 18a to 18d are electrically connected to the pairs of arm waveguides 15a to 15d, 16a to 16d, respectively. The pairs of signal wirings 17a to 17d, 18a to 18d are disposed on the pairs of arm waveguides 15a to 15d, 16a to 16d, respectively. The pairs of signal wirings 17a to 17d, 18a to 18d extend in the horizontal direction (the first direction, the x-direction). The pairs of signal wirings 17a to 17d, 18a to 18d are opposed to each other in the vertical direction (the second direction, the y-direction).

Lengths in the horizontal direction (the first direction, the x-direction) of the pairs of signal wirings 17a to 17d, 18a to 18d are shorter than lengths in the horizontal direction of the corresponding pairs of arm waveguides 15a to 15d, 16a to 16d. The lengths in the horizontal direction (the first direction, the x-direction) of the pairs of signal wirings 17a to 17d, 18a to 18d corresponding to the pairs of arm waveguides 15a to 15d, 16a to 16d are equal to each other. For example, the horizontal length of signal wiring 17a corresponding to arm waveguide 15a is equal to the horizontal length of signal wiring 18a corresponding to arm waveguide 16a. The horizontal lengths of signal wirings 17a to 17d, 18a to 18d can be equalized among the optical modulation units 13a to 13d.

As illustrated in FIG. 4, the pairs of signal wirings 17a to 17d, 18a to 18d include pairs of first signal wiring portions 161, 166, 171, 176, 181, 186, 191, 196, pairs of second signal wiring portions 162, 167, 172, 177, 182, 187, 192, 197 connected to one ends of the pairs of first signal wiring portions 161, 166, 171, 176, 181, 186, 191, 196, and pairs of third signal wiring portions 163, 168, 173, 178, 183, 188, 193, 198 connected to the other ends of the pairs of first signal wiring portions 161, 166, 171, 176, 181, 186, 191, 196, respectively.

The pairs of first signal wiring portions 161, 166, 171, 176, 181, 186, 191, 196 are provided on the pairs of arm waveguides 15a to 15d, 16a to 16d, and extend in the first direction (the x-direction). The pairs of second signal wiring portions 162, 167, 172, 177, 182, 187, 192, 197 extend from one ends of the pairs of first signal wiring portions 161, 166, 171, 176, 181, 186, 191, 196 so as to separate gradually from center lines in the second direction (the y-direction) of the plurality of optical modulation units 13a to 13d in the second direction (the y-direction) with the distance from the pairs of first signal wiring portions 161, 166, 171, 176, 181, 186, 191, 196 in the first direction (the x-direction) increases. In other words, a first inclination angle $\theta_1$ at the end of each of second signal wiring portions 162, 167, 172, 177, 182, 187, 192, 197 with respect to each of first signal wiring portions 161, 166, 171, 176, 181, 186, 191, 196 is greater than 90°, and is less than or equal to 180°. First inclination angle $\theta_1$ may be greater than or equal to 135°, be greater than or equal to 140°, and be greater than or equal to 150°. First inclination angle $\theta_1$ may be less than 180°, be less than or equal to 175°, or be less than or equal to 170°.

The ends of second signal wiring portions 162, 167, 172, 177, 182, 187, 192, 197 are portions connected to one ends of the first signal wiring portions 161, 166, 171, 176, 181, 186, 191, 196 in second signal wiring portions 162, 167, 172, 177, 182, 187, 192, 197. When the ends of second signal wiring portions 162, 167, 172, 177, 182, 187, 192, 197 have a linear shape, first inclination angle $\theta_1$ is defined as an angle between first signal wiring portions 161, 166, 171, 176, 181, 186, 191, 196 and the ends of corresponding second signal wiring portions 162, 167, 172, 177, 182, 187, 192, 197. When the ends of second signal wiring portions 162, 167, 172, 177, 182, 187, 192, 197 have a curved shape, first inclination angle $\theta_1$ is defined as an angle between first signal wiring portions 161, 166, 171, 176, 181, 186, 191, 196 and tangent lines of the ends of corresponding second signal wiring portions 162, 167, 172, 177, 182, 187, 192, 197. Second signal wiring portions 162, 167, 172, 177, 182, 187, 192, 197 do not include a portion bent at an angle less than or equal to 90 degrees.

Pairs of third signal wiring portions 163, 168, 173, 178, 183, 188, 193, 198 extend from other ends of the pairs of first signal wiring portions 161, 166, 171, 176, 181, 186, 191, 196 so as to separate gradually from center lines in the second direction (the y-direction) of the plurality of optical modulation units 13a to 13d in the second direction (the y-direction) with the distance from the pairs of first signal wiring portions 161, 166, 171, 176, 181, 186, 191, 196 in the first direction (the x-direction) increases. In other words, a second inclination angle $\theta_2$ at the end of each of third signal wiring portions 163, 168, 173, 178, 183, 188, 193, 198 with respect to each of first signal wiring portions 161, 166, 171, 176, 181, 186, 191, 196 is larger than 90°, and is less than 180°. Second inclination angle $\theta_2$ may be greater than or equal to 135°, be greater than or equal to 140°, or be greater than or equal to 150°. Second inclination angle $\theta_2$ may be less than 180°, be greater than or equal to 175°, or be greater than or equal to 170°.

The ends of third signal wiring portions 163, 168, 173, 178, 183, 188, 193, 198 are portions connected to the other ends of first signal wiring portions 161, 166, 171, 176, 181, 186, 191, 196 in third signal wiring portions 163, 168, 173, 178, 183, 188, 193, 198. When the ends of third signal wiring portions 163, 168, 173, 178, 183, 188, 193, 198 have a linear shape, second inclination angle $\theta_2$ is defined as an angle between first signal wiring portions 161, 166, 171, 176, 181, 186, 191, 196 and the ends of corresponding third signal wiring portions 163, 168, 173, 178, 183, 188, 193, 198. When the ends of third signal wiring portions 163, 168, 173, 178, 183, 188, 193, 198 have a curved shape, second inclination angle $\theta_2$ is defined as an angle between first signal wiring portions 161, 166, 171, 176, 181, 186, 191, 196, and the tangential lines of corresponding third signal wiring portions 163, 168, 173, 178, 183, 188, 193, 198. Third signal wiring portions 163, 168, 173, 178, 183, 188, 193, 198 do not include a portion bent at an angle less than or equal to 90 degrees.

Output optical waveguides 14a, 14b include four branched optical waveguides. The four branched optical waveguides are connected to arm waveguides 15a to 15d, 16a to 16d. In order to multiplex the optical signals output from optical modulation units 13a to 13d, output optical waveguide 14a includes a first 2×1 multiplexing waveguide, and output optical waveguide 14b includes a second 2×1 multiplexing waveguide. In the description, the 2×1 multiplexing waveguide means a multiplexing waveguide including two input units and one output unit. The two input units of the first 2×1 multiplexing waveguide are connected to optical modulation unit 13a and optical modulation unit 13b, respectively. The two input units of the second 2×1 multiplexing waveguide are connected to optical modulation unit 13c and optical modulation unit 13d, respectively. One output unit of the first 2×1 multiplexing waveguide is connected to outgoing port 5a. One output unit of the second 2×1 multiplexing waveguide is connected to outgoing port 5b.

Outgoing ports 5a, 5b are provided on first short side 10p of optical modulator 10 in which incidence port 11 is provided. The optical signals output from optical modulation units 13a, 13b are multiplexed by output optical waveguide 14a. The optical signals output from optical modulation units 13c, 13d are multiplexed by output optical waveguide 14b. The optical signal multiplexed by output optical waveguide 14a is output from outgoing port 5a connected to output optical waveguide 14a. The optical signal multiplexed by output optical waveguide 14b is output from outgoing port 5b connected to output optical waveguide 14b.

The plurality of optical modulation units 13a to 13d include pairs of electrode pads 32a to 32d, 33a to 33d at one ends of the pairs of signal wirings 17a to 17d, 18a to 18d, respectively. The pairs of electrode pads 32a to 32d, 33a to 33d are connected to the pairs of second signal wiring portions 162, 167, 172, 177, 182, 187, 192, 197, respectively. The pairs of electrode pads 32a to 32d, 33a to 33d are electrically connected to wiring board 40. Electrode pads 32a to 32d, 33a to 33d are provided at positions adjacent to arm waveguides 15a to 15d, 16a to 16d of corresponding signal wirings 17a to 17d, 18a to 18d, respectively. Electrode pads 32a to 32d, 33a to 33d are separated from the short sides (first short side 10p, second short side 10q) of optical modulator 10. Electrode pads 32a to 32d, 33a to 33d are separated from the long side of optical modulator 10.

Electrode pads 32a to 32d, 33a to 33d are arranged at equal intervals on straight lines L1, L5 extending in the vertical direction (the second direction, the y-direction). Specifically, electrode pads 32a, 32b, 33a, 33b of optical modulation units 13a, 13b are arranged at equal intervals on straight line L1 extending in the vertical direction (the second direction, the y-direction). Electrode pads 32c, 32d, 33c, 33d of optical modulation units 13c, 13d are arranged at equal intervals on a straight line L6 different from straight line L1 on which electrode pads 32a, 32b, 33a, 33b are arranged. Straight line L5 extends in the vertical direction (the second direction, the y-direction). Straight line L5 is displaced from straight line L1 in the horizontal direction (the first direction, the y-direction).

The plurality of optical modulation units 13a to 13d includes pairs of electrode pads 34a to 34d, 35a to 35d at the other ends of the pairs of signal wirings 17a to 17d, 18a to 18d, respectively. The pairs of electrode pads 34a to 34d, 35a to 35d are connected to the pairs of third signal wiring portions 163, 168, 173, 178, 183, 188, 193, 198, respectively. The pairs of electrode pads 34a to 34d, 35a to 35d are electrically connected to terminal board 50. Electrode pads 34a to 34d, 35a to 35d are also provided at positions adjacent to arm waveguides 15a to 15d, 16a to 16d of corresponding signal wirings 17a to 17d, 18a to 18d, respectively. Electrode pads 34a to 34d, 35a to 35d are separated from the short sides (first short side 10p, second short side 10q) of optical modulator 10. Electrode pads 34a to 34d, 35a to 35d are separated from the long side of optical modulator 10.

Electrode pads 34a to 34d, 35a to 35d are arranged at equal intervals on straight lines L2, L6 extending in the vertical direction (the second direction, the y-direction). Specifically, electrode pads 34a, 34b, 35a, 35b of optical modulation units 13a, 13b are arranged at equal intervals on straight line L2 extending in the vertical direction (the second direction, the y-direction). Electrode pads 34c, 34d, 35c, 35d of optical modulation units 13c, 13d are arranged at equal intervals on straight line L6 different from straight line L2 on which electrode pads 34a, 34b, 35a, 35b are arranged. Straight line L6 extends in the vertical direction (the second direction, the y-direction). Straight line L6 is displaced from straight line L2 in the horizontal direction (the first direction, the y-direction).

The plurality of optical modulation units 13a to 13d include pairs of ground wirings 19a to 19e, respectively. The pairs of ground wirings 19a to 19e extend in the horizontal direction (the first direction, the x-direction). The pairs of ground wirings 19a to 19e are provided on both sides of the pairs of signal wirings 17a to 17d, 18a to 18d in the second direction (the y-direction), and opposed to the pairs of signal wirings 17a to 17d, 18a to 18d. That is, the pairs of signal wirings 17a to 17d, 18a to 18d are located between the pairs of ground wirings 19a to 19e. Ground wirings 19b to 19d may be shared by two optical modulation units 13a to 13d adjacent to each other. Specifically, ground wiring 19b may be shared by two optical modulation units 13a, 13b adjacent to each other. Ground wiring 19c may be shared by two optical modulation units 13b, 13c adjacent to each other. Ground wiring 19d may be shared by two optical modulation units 13c, 13d adjacent to each other.

Ground wirings 19a, 19b, 19d, 19e have a rectangular shape. The lengths in the horizontal direction (the first direction, the x-direction) of the portions of the ground wirings 19a, 19b, 19d, 19e opposed to signal wirings 17a to 17d, 18a to 18d are shorter than the lengths in the horizontal direction (the first direction, the x-direction) of signal wirings 17a to 17d, 18a to 18d. Ground wiring 19c has a crank shape. The length in the horizontal direction (the first direction, the x-direction) of the portion of the ground wiring 19c opposed to signal wirings 18b, 17c is shorter than the length in the horizontal direction (the first direction, the x-direction) of signal wirings 18b, 17c.

When ground wirings 19a to 19e are provided on both sides of signal wirings 17a to 17d, 18a to 18d, a differential coplanar line is formed by signal wirings 17a to 17d, 18a to 18d and ground wirings 19a to 19e. Consequently, a loss due to impedance matching can be prevented when a high-frequency differential signal having characteristic impedance is input to signal wirings 17a to 17d, 18a to 18d.

The plurality of optical modulation units 13a to 13d include pairs of electrode pads 36a to 36e at one ends of the pairs of ground wirings 19a to 19e. The pairs of electrode pads 36a to 36e are located close to the pairs of electrode pads 32a to 32d, 33a to 33d, and connected to the pairs of ground wirings 19a to 19e. The pairs of electrode pads 36a to 36e are electrically connected to wiring board 40. Electrode pads 36a to 36e are provided at positions adjacent to arm waveguides 15a to 15d, 16a to 16d of corresponding signal wirings 17a to 17d, 18a to 18d. Electrode pads 36a to 36e are separated from the short sides (first short side 10p, second short side 10q) of optical modulator 10. Electrode pads 36a to 36e are separated from the long side of optical modulator 10.

The pairs of electrode pads 36a to 36e are opposed to corresponding pairs of signal wirings 17a to 17d, 18a to 18d, respectively. Electrode pads 36a to 36e are arranged at equal intervals on straight lines L3, L7 extending in the vertical direction (the second direction, the y-direction). Specifically, electrode pads 36a, 36b are arranged at equal intervals on straight line L3 extending in the vertical direction (the second direction, the y-direction). Electrode pads 36c to 36e are arranged at equal intervals on straight line L7 different from straight line L3 on which electrode pads 36a, 36b are arranged. Straight line L7 extends in the vertical direction (the second direction, the y-direction). Straight line L7 is displaced from straight line L3 in the horizontal direction (the first direction, the y-direction).

Optical modulator 10 includes pairs of electrode pads 37a to 37e at the other ends of ground wirings 19a to 19e. The pairs of electrode pads 37a to 37e are located close to the pair of electrode pads 34a to 34d, 35a to 35d, and connected to the pairs of ground wirings 19a to 19e. The pairs of electrode pads 37a to 37e are electrically connected to terminal board 50. Electrode pads 37a to 37e are also provided at positions of corresponding signal wirings 17a to 17d, 18a to 18d adjacent to arm waveguides 15a to 15d, 16a to 16d. The pairs of electrode pads 37a to 37e are opposed to corresponding pair of signal wirings 17a to 17d, 18a to 18d. Electrode pads 37a to 37e are separated from the short sides (first short side 10p, second short side 10q) of optical modulator 10. Electrode pads 37a to 37e are separated from the long side of optical modulator 10.

Electrode pads 37a to 37e are arranged at equal intervals on straight lines L4, L8 extending in the vertical direction (the second direction, the y-direction). Specifically, electrode pads 37a to 37c are arranged at equal intervals on straight line L4 extending in the vertical direction (the second direction, the y-direction). Electrode pads 37d, 37e are arranged at equal intervals on straight line L8 different from straight line L4 on which electrode pads 37a to 37c are arranged. Straight line L8 extends in the vertical direction (the second direction, the y-direction). Straight line L8 is displaced from straight line L4 in the horizontal direction (the first direction, the y-direction).

As used herein, a pad pitch means a distance between centers of electrode pads adjacent to each other. A pad pitch P2, which is a second interval between electrode pads 36a to 36e, 37a to 37e in the vertical direction (the second direction, the y-direction), is larger than a pad pitch P1, which is a first interval between electrode pads 32a to 32d, 33a to 33d, 34a to 34d, 35a to 35d in the vertical direction (the second direction, the y-direction). Pad pitches P2 of electrode pads 36a to 36e, 37a to 37e are less than three times pad pitches P1 of electrode pads 32a to 32d, 33a to 33d, 34a to 34d, 35a to 35d.

In each of the plurality of optical modulation units 13a to 13d, the pairs of electrode pads 36a to 36e, 37a to 37e are disposed at positions displaced from the corresponding pairs of electrode pads 32a to 32d, 33a to 33d, 34a to 34d, 35a to 35d in the horizontal direction (the first direction, the x-direction) and the vertical direction (the second direction, the y-direction). In the horizontal direction (the first direction, the x-direction), the pairs of electrode pads 36a to 36e, 37a to 37e are separated from the corresponding pairs of electrode pads 32a to 32d, 33a to 33d, 34a to 34d, 35a to 35d.

In the vertical direction (the second direction, the y-direction), the pairs of electrode pads 36a to 36e, 37a to 37e are displaced from the corresponding pairs of electrode pads 32a to 32d, 33a to 33d, 34a to 34d, 35a to 35d by less than the first distance in the second direction (the y-direction) so as to be separated from the center lines of optical modulation units 13a to 13d. The first interval is an interval (for example, pad pitch P1) in the second direction between the centers of the pairs of electrode pads 32a to 32d, 33a to 33d, 34a to 34d, 35a to 35d. In the vertical direction (the second direction, the y-direction), the pairs of electrode pads 36a to 36e, 37a to 37e may partially overlap the corresponding pairs of electrode pads 32a to 32d, 33a to 33d, 34a to 34d, 35a to 35d. Thus, the pairs of electrode pads 32a to 32d, 33a to 33d, 34a to 34d, 35a to 35d can be located between the corresponding pairs of electrode pads 36a to 36e, 37a to 37e in the vertical direction (the second direction, the y-direction).

Specifically, electrode pads 36a to 36e, 37a to 37e are disposed at positions displaced from corresponding electrode pads 32a to 32d, 33a to 33d, 34a to 34d, 35a to 35d by pad pitches P1 of electrode pads 32a to 32d, 33a to 33d, 34a to 34d, 35a to 35d in the horizontal direction (the first direction, the x-direction) and displaced by half pad pitches P1 in the vertical direction (the second direction, the y-direction). That is, electrode pads 36a to 36e, 37a to 37e, are disposed on straight lines L3, L4, L7, L8 different from straight lines L1, L2, L5, L6 on which electrode pads 32a to 32d, 33a to 33d, 34a to 34d, 35a to 35d are disposed.

Figure 5:
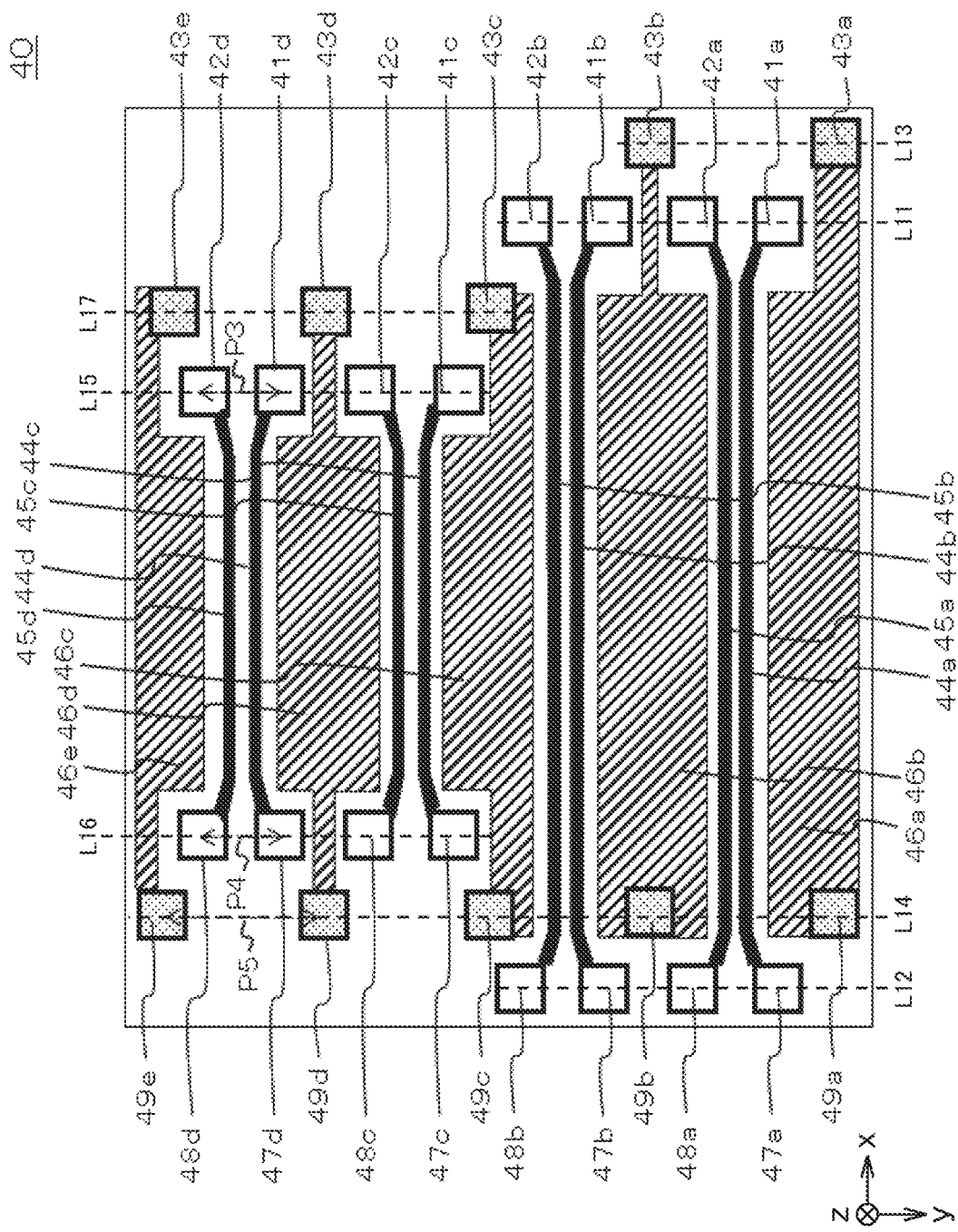
FIG. 5 is a schematic enlarged bottom view illustrating a wiring board in the optical transmission module of the first embodiment.

Referring to FIG. 5, wiring board 40 in optical transmission module 100 will be described in detail. Wiring board 40 includes electrode pads 41a to 41d, 42a to 42d, electrode pads 43a to 43e, signal wirings 44a to 44d, 45a to 45d, ground wirings 46a to 46e, electrode pads 47a to 47d, 48a to 48d, and electrode pads 49a to 49e. Electrode pads 41a to 41d, 42a to 42d, electrode pads 43a to 43e, signal wirings 44a to 44d, 45a to 45d, ground wirings 46a to 46e, electrode pads 47a to 47d, 48a to 48d, and electrode pads 49a to 49e are provided on the lower surface of wiring board 40.

Electrode pads 41a to 41d and 42a to 42d are provided at one ends of corresponding signal wirings 44a to 44d, 45a to 45d. Electrode pads 41a to 41d, 42a to 42d are opposed to electrode pads 32a to 32d, 33a to 33d of optical modulator 10. Electrode pads 41a to 41d, 42a to 42d are connected to electrode pads 32a to 32d, 33a to 33d of optical modulator 10 by bumps 80. Electrode pads 41a to 41d, 42a to 42d are opposed to corresponding ground wirings 44a to 44e. Electrode pads 41a, 41b, 42a, 42b are arranged at equal intervals on a straight line L11 extending in the vertical direction (the second direction, the y-direction). Electrode pads 41c, 41d, 42c, 42d are arranged at equal intervals on a straight line L15 different from straight line L11 on which electrode pads 41a, 41b, 42a, 42b are arranged. Straight line L15 extends in the vertical direction (the second direction, the y-direction).

Electrode pads 43a to 43e are provided at one ends of ground wirings 46a to 46e. Electrode pads 43a to 43e are opposed to electrode pads 36a to 36e of optical modulator 10. Electrode pads 43a to 43e are connected to electrode pads 36a to 36e of optical modulator 10 by bumps 80. Electrode pads 43a and 43b are arranged at equal intervals on a straight line L13 extending in the vertical direction (the second direction, the y-direction). Electrode pads 43c to 43e are arranged at equal intervals on a straight line L17 different from straight line L13 on which electrode pads 43a and 43b are arranged. Straight line L17 extends in the vertical direction (the second direction, the y-direction).

Electrode pads 43a to 43e are displaced at positions displaced from corresponding electrode pads 41a to 41d, 42a to 42d in the horizontal direction (the first direction, the x-direction) and the vertical direction (the second direction, the y-direction). In the horizontal direction (the first direction, the x-direction), electrode pads 43a to 43e are separated from corresponding electrode pads 41a to 41d, 42a to 42d.

In the vertical direction (the second direction, the y-direction), electrode pads 43a to 43e are displaced from electrode pads 41a to 41d, 42a to 42d in a direction separating from the corresponding pairs of signal wirings 44a to 44d, 45a to 45d. The displacement of electrode pads 43a to 43e from electrode pads 41a to 41d, 42a to 42d in the vertical direction (the second direction, the y-direction) is less than pad pitches P3 of electrode pads 41a to 41d, 42a to 42d. In the vertical direction (the second direction, the y-direction), electrode pads 43a to 43e may partially overlap corresponding electrode pads 41a to 41d, 42a to 42d. In this way, electrode pads 41a to 41d, 42a to 42d can be located between corresponding electrode pads 43a to 43e in the vertical direction (the second direction, the y-direction).

Specifically, electrode pads 43a to 43e are disposed at positions displaced from corresponding electrode pads 41a to 41d, 42a to 42d by pad pitch P3 of electrode pads 41a to 41d, 42a to 42d in the horizontal direction (the first direction, the x-direction) and displaced by half pad pitch P3 of electrode pads 41a to 41d, 42a to 42d in the vertical direction (the second direction, the y-direction). That is, electrode pads 43a to 43e are disposed on straight lines L13, L17 different from straight lines L11, L15 on which electrode pads 41a to 41d, 42a to 42d are disposed.

Signal wirings 44a to 44d, 45a to 45d extend in the horizontal direction (the first direction, the x-direction) from electrode pads 41a to 41d, 42a to 42d, respectively. Signal wirings 44a to 44d, 45a to 45d are opposed to each other in parallel. Specifically, signal wirings 44a to 44d, 45a to 45d corresponding to signal wirings 17a to 17d, 18a to 18d of the pairs of arm waveguides 15a to 15d, 16a to 16d are opposed to each other in parallel. The lengths in the horizontal direction (the first direction, the x-direction) of signal wirings 44a to 44d, 45a to 45d corresponding to signal wirings 17a to 17d, 18a to 18d of the pairs of arm waveguides 15a to 15d, 16a to 16d are equal to each other.

Ground wirings 46a to 46e extend in the horizontal direction (the first direction, the x-direction) from electrode pads 43a to 43e, respectively. Ground wirings 46a to 46e are opposed to adjacent signal wirings 44a to 44d, 45a to 45d in parallel. Specifically, the portions of ground wirings 46a to 46e opposed to signal wirings 44a to 44d, 45a to 45d are opposed to signal wirings 44a to 44d, 45a to 45d in parallel. Ground wirings 46a to 46e are provided on both sides of corresponding pairs of signal wirings 44a to 44d, 45a to 45d.

When ground wirings 46a to 46e are provided on both sides of signal wirings 44a to 44d, 45a to 45d, the differential coplanar line is formed by signal wirings 44a to 44d, 45a to 45d and ground wirings 46a to 46e. Consequently, the loss due to the impedance matching can be prevented when the high-frequency differential signal having the characteristic impedance is input to the signal wiring.

Signal wirings 17a to 17d, 18a to 18d and electrode pads 32a to 32d, 33a to 33d of optical modulator 10 are opposed to ground wirings 46a to 46e and electrode pads 43a to 43e of wiring board 40. For this reason, the differential coplanar line is formed between signal wirings 17a to 17d, 18a to 18d and the electrode pads 32a to 32d, 33a to 33d and between ground wirings 46a to 46e and electrode pads 43a to 43e. The loss due to the impedance matching can be prevented when the high-frequency differential signal having the characteristic impedance is input to signal wirings 17a to 17d, 18a to 18d.

The differential coplanar lines formed by signal wirings 17a, 18a of optical modulation unit 13a and ground wirings 46a, 46b and electrode pads 43a, 43b of wiring board 40 will be described as an example. Wiring board 40 is disposed above optical modulator 10. Consequently, electrode pads 32a, 33a and signal wirings 17a, 18a close to electrode pads 32a, 33a are opposed to ground wirings 46a, 46b and electrode pads 43a, 43b of wiring board 40 obliquely above. The differential coplanar lines are formed between signal wirings 17a, 18a and electrode pads 32a, 33a and between ground wirings 46a, 46b and electrode pads 43a, 43b. The same applies to the differential coplanar line formed by wiring board 40 and optical modulation units 13b to 13d. In contrast, unless wiring board 40 is disposed above optical modulator 10, the differential coplanar line cannot be formed by electrode pads 32a, 33a and signal wirings 17a, 17b, 18a, 18b close to electrode pads 32a, 33a.

The differential coplanar line formed by signal wiring 45b and electrode pad 42b of wiring board 40 and ground wiring 19c and electrode pad 36c of optical modulator 10 will be described. Wiring board 40 is disposed above optical modulator 10. Consequently, electrode pad 42b and signal wiring 45b close to electrode pad 42b are opposed to ground wiring 19c and electrode pad 36c of optical modulator 10 obliquely below. The differential coplanar line is formed between signal wiring 45b and electrode pad 42b and ground wiring 19c and electrode pad 36c. In contrast, unless optical modulator 10 is disposed below wiring board 40, the differential coplanar line cannot be formed by electrode pad 42b and signal wiring 45b close to electrode pad 42b.

Thus, the differential coplanar lines are continuously formed over signal wirings 44a to 44d, 45a to 45d of wiring board 40, bumps 80, and signal wirings 17a to 17d, 18a to 18d of optical modulator 10.

Electrode pads 47a to 47d, 48a to 48d are electrically connected to the other ends of corresponding signal wirings 44a to 44d, 45a to 45d. Electrode pads 47a to 47d, 48a to 48d are provided at the other ends of corresponding signal wirings 44a to 44d, 45a to 45d. Electrode pads 47a to 47d, 48a to 48d are electrically connected to wiring board 66 by bumps 80. Electrode pads 47a to 47d, 48a to 48d are arranged at equal intervals on straight lines L12, L16 extending in the vertical direction (the second direction, the y-direction). Specifically, electrode pads 47a, 47b, 48a, 48b are arranged at equal intervals on straight line L12 extending in the vertical direction (the second direction, the y-direction). Electrode pads 47c, 47d, 48c, 48d are arranged at equal intervals on straight line L16 different from straight line L12 on which electrode pads 47a, 47b, 48a, 48b are arranged. Straight line L13 extends in the vertical direction (the second direction, the y-direction).

Electrode pads 49a to 49e are electrically connected to the other ends of corresponding ground wirings 46a to 46e.

Electrode pads 49a to 49e are provided at the other ends of corresponding ground wirings 46a to 46e. Electrode pads 49a to 49e are electrically connected to wiring board 66 by bumps 80. Electrode pads 49a to 49e are arranged at equal intervals on a straight line L14 different from straight lines L12, L16. Straight line L14 extends in the vertical direction (the second direction, the y-direction).

Pad pitches P5 of electrode pads 49a to 49e are larger than pad pitches P4 of electrode pads 47a to 47d, 48a to 48d. Pad pitches P5 of electrode pads 49a to 49e are less than three times pad pitches P4 of electrode pads 47a to 47d, 48a to 48d.

Electrode pads 49a to 49e are displaced at positions displaced from corresponding electrode pads 47a to 47d, 48a to 48d in the horizontal direction (the first direction, the x-direction) and the vertical direction (the second direction, the y-direction). In the horizontal direction (the first direction, the x-direction), electrode pads 49a to 49e are separated from corresponding electrode pads 47a to 47d, 48a to 48d.

In the vertical direction (the second direction, the y-direction), electrode pads 49a to 49e are displaced from electrode pads 47a to 47d, 48a to 48d in the direction separating from the corresponding pair of signal wirings 44a to 44d, 45a to 45d. The displacement of electrode pads 49a to 49e from electrode pads 47a to 47d, 48a to 48d in the vertical direction (the second direction, the y-direction) is less than pad pitches P4 of electrode pads 47a to 47d, 48a to 48d. In the vertical direction (the second direction, the y-direction), electrode pads 49a to 49e may partially overlap corresponding electrode pads 47a to 47d, 48a to 48d. In this way, electrode pads 47a to 47d, 48a to 48d can be located between corresponding electrode pads 49a to 49e in the vertical direction (the second direction, the y-direction).

Specifically, electrode pads 49a to 49e are disposed at the positions displaced from electrode pads 47a to 47d, 48a to 48d by pad pitches P4 of electrode pads 47a to 47d, 48a to 48d in the horizontal direction (the first direction, the x-direction) and displaced by half pad pitches P4 of electrode pads 47a to 47d, 48a to 48d in the vertical direction (the second direction, the y-direction). That is, electrode pads 49a to 49e are disposed on straight line L14 different from straight lines L12, L16 on which electrode pads 47a to 47d, 48a to 48d are disposed.

Referring to FIGS. 1 and 3, operation of optical modulator 10 and optical transmission module 100 will be described.

As illustrated in FIG. 1, CW laser 20 emits the CW light. The CW light is collected by lens 90, and is incident on incident port 11 of optical modulator 10. As illustrated in FIG. 3, the CW light incident on incident port 11 is propagated through input optical waveguide 12 as the optical signal, and input to optical modulation units 13a to 13d. As illustrated in FIG. 1, the CW light is also emitted from the end face on the opposite side to CW laser 20. The CW light is collected by lens 91, and is incident on optical fiber 110. The CW light is output to the outside of optical transmission module 100 as local light for detecting an optical phase signal.

As illustrated in FIGS. 1 and 3, four differential signals input from flexible board 68 are amplified and reshaped by driver IC 30. These differential signals are input to electrode pads 32a, 32b, 33a, 33b of optical modulation units 13a, 13b through wiring board 66 and wiring board 40. Similarly, other four differential signals are input to electrode pads 32c, 32d, 33c, 33d of optical modulation units 13c, 13d.

The optical signals input to optical modulation units 13a to 13d generate optical signals that are phase-modulated signals based on the differential signals. Specifically, optical modulation units 13a, 13c generate the optical signal that is a phase-modulated signal on which an I-phase (in-phase) component is superimposed. Optical modulation units 13b, 13d generate the optical signal that is a phase-modulated signal on which a Q-phase (quadrature phase) component is superimposed.

The differential signals input to optical modulation units 13a to 13d are propagated through signal wirings 17a to 17d, 18a to 18d, electrode pads 34a to 34d, 35a to 35d, signal wiring 72, via electrode 82, and signal wiring 78, and terminated by terminal resistor 84.

The optical signal that is the phase-modulated signal, which is generated by optical modulation unit 13a and on which the I-phase component is superimposed, and the optical signal that is the phase-modulated signal, which is generated by optical modulation unit 13b and on which the Q-phase component is superimposed, are multiplexed by output optical waveguide 14a to generate the optical signal that is a multilevel modulated signal such as Quadrature Phase Shift Keying (QPSK) and Quadrature Amplitude Modulation (QAM). The optical signal, which is the multilevel modulated signal, is output from outgoing port 5a to the outside of optical modulator 10. The optical signal that is the phase-modulated signal, which is generated by optical modulation unit 13c and on which the I-phase component is superimposed, and the optical signal that is the phase-modulated signal, which is generated by optical modulation unit 13d and on which the Q-phase component is superimposed, are multiplexed by output optical waveguide 14b to generate the optical signal that is the multilevel modulated signal such as the quadrature phase shift keying and the quadrature amplitude modulation. The optical signal, which is the multilevel modulated signal, is output from outgoing port 5b to the outside of optical modulator 10.

The optical signal, which is the multilevel modulated signal output from outgoing port 5a, is shaped into parallel light by lens 92 as illustrated in FIG. 1. Wave plate 94 rotates the polarization of the optical signal by 90 degrees. Then, the optical signal is incident on polarization beam splitter 96. The optical signal, which is the multilevel modulated signal output from outgoing port 5b, is shaped into parallel light by lens 93, is reflected by mirror 95, and is incident on polarization beam splitter 96. The two optical signals, which are the two multilevel modulated signals incident on polarization beam splitter 96, are multiplexed by polarization beam splitter 96 to become the optical signal that is a polarization multiplexing signal. The optical signal is collected by lens 97, and is incident on optical fiber 111. The optical signal is output to the outside of optical transmission module 100.

Action and effect of optical modulator 10 and optical transmission module 100 of the first embodiment will be described.

In optical modulator 10 and optical transmission module 100 of the first embodiment, electrode pads 36a to 36e, 37a to 37e are disposed at positions displaced in the horizontal direction (the first direction, the x-direction) and the vertical direction (the second direction, the y-direction) from corresponding electrode pads 32a to 32d, 33a to 33d, 34a to 34d, 35a to 35d. In the horizontal direction (the first direction, the x-direction), electrode pads 36a to 36e, 37a to 37e are separated from corresponding electrode pads 32a to 32d, 33a to 33d, 34a to 34d, 35a to 35d. In the vertical direction (the second direction, the y-direction), electrode pads 36a to 36e, 37a to 37e are disposed from electrode pads 32a to 32d, 33a to 33d, 34a to 34d, 35a to 35d in the direction separating from the corresponding pairs of signal wirings 17a to 17d, 18a to 18d. The displacement of electrode pad 36a to 36e, 37a to 37e from electrode pads 32a to 32d, 33a to 33d, 34a to 34d, 35a to 35d in the vertical direction (the second direction, the y-direction) is less than pad pitches P1 of electrode pads 32a to 32d, 33a to 33d.

Consequently, the lengths of first short side 10p and second short side 10q of optical modulator 10 can be decreased. Optical modulator 10 can be downsized. Optical transmission module 100 including optical modulator 10 can be downsized.

Specifically, electrode pads 36a to 36e, 37a to 37e are disposed at positions displaced from corresponding electrode pads 32a to 32d, 33a to 33d, 34a to 34d, 35a to 35d by pad pitches P1 of electrode pads 32a to 32d, 33a to 33d, 34a to 34d, 35a to 35d in the horizontal direction (the first direction, the x-direction) and displaced by half pad pitches P1 of electrode pads 32a to 32d, 33a to 33d, 34a to 34d, 35a to 35d in the vertical direction (the second direction, the y-direction). Electrode pads 36a to 36e, 37a to 37e are disposed on straight line L3, L4, L7, L8 different from straight line L1, L2, L5, L6 on which electrode pads 32a to 32d, 33a to 33d, 34a to 34d, 35a to 35d are disposed.

For example, in one example of optical modulator 10 of the first embodiment, as illustrated in FIG. 3, the electrode pad has the size of 80 μm and the pad has the pitch of 100 μm. As illustrated in FIG. 3, the optical modulator of the example includes eight signal wiring electrode pads and five ground wiring electrode pads. In the optical modulator of the example, electrode pads 36a to 36e, 37a to 37e are disposed at positions displaced from corresponding electrode pads 32a to 32d, 33a to 33d, 34a to 34d, 35a to 35d by pad pitches P1 of electrode pads 32a to 32d, 33a to 33d, 34a to 34d, 35a to 35d in the horizontal direction (the first direction, the x-direction) and displaced by half pad pitches P1 in the vertical direction (the second direction, the y-direction). The short side (first short side 10p, second short side 10q) of the optical modulator of the example has the length of 100 μm×{(4−1)+0.5×2+80 μm×½}×2=880 μm. In the optical modulator of the example, electrode pad 32a to 32d, 33a to 33d, 34a to 34d, 35a to 35d, 36a to 36e, 37a to 37e can be arrayed with a length of 68.8% of a short side length (1280 μm) of an optical modulator of a comparative example (to be described later).

In contrast, in the optical modulator of the comparative example, the signal wiring bonding pad (electrode pads 32a to 32d, 33a to 33d, 34a to 34d, 35a to 35d) and a ground wiring bonding pads (electrode pads 36a to 36e, 37a to 37) are arrayed in a line on the same straight line on the short side of the optical modulator. For this reason, the optical modulator of the comparative example has the short side length depending on the pad size, the pad interval, and the number of pads. For example, the optical modulator of the comparative example has the pad size of 80 μm and the pad pitch of 100 μm similarly to the optical modulator of the example. The optical modulator of the comparative example includes eight signal wiring electrode pads and five ground wiring electrode pads similarly to the optical modulator of the example. The short side of the optical modulator of the comparative example has the length of at least 100 μm×(13−1)+80 μm×½×2=1280 μm.

In optical transmission module 100 of the first embodiment, ground wirings 19a to 19e are provided so as to sandwich corresponding signal wirings 17a to 17d, 18a to 18d, and so as to be opposed to corresponding signal wirings 17a to 17d, 18a to 18d. Ground wirings 19a to 19e and signal wirings 17a to 17d, 18a to 18d extend in the horizontal direction (the first direction, the x-direction). Ground wirings 46a to 46e of wiring board 40 are provided so as to sandwich corresponding signal wirings 44a to 44d, 45a to 45d, and so as to be opposed to corresponding signal wirings 44a to 44d, 45a to 45d. Ground wirings 46a to 46e and signal wirings 44a to 44d, 45a to 45d extend in the horizontal direction (the first direction, the x-direction).

Because wiring board 40 is disposed above optical modulator 10, signal wirings 17a to 17d, 18a to 18d are opposed to ground wirings 46a to 46e of wiring board 40. Electrode pads 32a to 32d, 33a to 33d and signal wirings 17a to 17d, 18a to 18d close to electrode pads 32a to 32d, 33a to 33d are opposed to ground wirings 46a to 46d and electrode pads 43a to 43e of wiring board 40 obliquely above. The differential coplanar line is formed between signal wirings 17a to 17d, 18a to 18d and electrode pads 32a to 32d, 33a to 33d and ground wirings 46a to 46e and electrode pads 43a to 43e. Furthermore, electrode pad 42b and signal wiring 45b close to electrode pad 42b are opposed to ground wiring 19c and electrode pad 36c of the optical modulator 10 obliquely below. The differential coplanar line is formed between signal wiring 45b and electrode pad 42b and ground wiring 19c and electrode pad 36c.

Thus, the differential coplanar lines are continuously formed over signal wirings 44a to 44d, 45a to 45d of wiring board 40, bumps 80, and signal wirings 17a to 17d, 18a to 18d of optical modulator 10. Consequently, the loss due to the impedance matching can be prevented when the high-frequency differential signal having the characteristic impedance is input to signal wirings 17a to 17d, 18a to 18d, 44a to 44d, 45a to 45d. The frequency response characteristic of the electric signal can be improved in optical transmission module 100.

In optical transmission module 100, optical modulator 10 and driver IC 30 are electrically connected to each other using wiring board 40 in which a restriction on wiring design is loosened. Consequently, the impedance of the electric line can easily be adjusted using wiring board 40. The frequency response characteristic of the electric signal can be improved in optical transmission module 100. In contrast, in the comparative example in which the wire bonding is used instead of wiring board 40 to lead out the wiring from the electrode pad of the optical modulator, the length of the bonding wire needs to be shortened in order to decrease the inductance. Consequently, in the comparative example, there is the restriction on the wiring design of the signal wiring and the electrode pad, so that the impedance is hardly matched.

In optical modulator 10, signal wirings 17a to 17d, 18a to 18d extend in the horizontal direction (the first direction, the x-direction). The skew differences between signal wirings 17a to 17d, 18a to 18d mainly depend on the lengths in the horizontal direction (the first direction, the x-direction) of signal wirings 17a to 17d, 18a to 18d. The skew difference between the differential signals input to optical modulator 10 can be decreased between signal wirings 17a to 17d, 18a to 18d by adjusting the lengths in the horizontal direction (the first direction, the x-direction) of signal wirings 17a to 17d, 18a to 18d. Consequently, the frequency response characteristics of the electric signal can be improved in optical modulator 10. Specifically, the skew difference between the differential signals can be eliminated by equalizing the lengths in the horizontal direction (the first direction, the x-direction) of signal wirings 17a to 17d, 18a to 18d to each other.

In optical transmission module 100, signal wirings 44a to 44d, 45a to 45d extend in the horizontal direction (the first direction, the x-direction). The skew differences between signal wirings 44a to 44d, 45a to 45d mainly depend on the lengths in the horizontal direction (the first direction, the x-direction) of signal wirings 44a to 44d, 45a to 45d. The skew difference of the differential signal can be decreased between signal wirings 44a to 44d, 45a to 45d by adjusting the lengths in the horizontal direction (the first direction, the x-direction) of signal wirings 44a to 44d, 45a to 45d. Consequently, the frequency response characteristic of the electric signal can be improved in optical transmission module 100. Specifically, the skew difference between the differential signals can be eliminated by equalizing the lengths in the horizontal direction (the first direction, the x-direction) of signal wirings 44a to 44d, 45a to 45d to each other.

As described above, the frequency response characteristic of the input electric signal can be improved in optical modulator 10 and optical transmission module 100 of the first embodiment. Optical modulator 10 and optical transmission module 100 can be downsized.

A plurality of modifications of optical modulator 10 and optical transmission module 100 of the first embodiment will be described below.

In the first embodiment, electrode pads 32a to 32d, 33a to 33d, 34a to 34d, 35a to 35d of optical modulator 10 are provided closer to second short side 10q of optical modulator 10 than electrode pads 36a to 36e, 37a to 37e. On the other hand, in a first modification of the first embodiment, electrode pads 36a to 36e may be provided closer to second short side 10q of optical modulator 10 than electrode pads 32a to 32d, 33a to 33d, and electrode pads 37a to 37e may be provided closer to first short side 10p of optical modulator 10 than electrode pads 34a to 34d, 35a to 35d. In the first modification, electrode pads 32a to 32d, 33a to 33d, 34a to 34d, 35a to 35d are located adjacent to ground wirings 19a to 19e. Electrode pads 41a to 41d, 42a to 42d, 43a to 43e of wiring board 40 are also provided corresponding to the dispositions of electrode pads 32a to 32d, 33a to 33d, 36a to 36e of optical modulator 10.

In the first embodiment, the number of optical modulation units 13a to 13d included in optical modulator 10 is four. However, in a second modification, the number of optical modulation units included in the optical modulator is not limited to four.

In the first embodiment, incident port 11 and outgoing ports 5a, 5b of optical modulator 10 are provided in first short side 10p of optical modulator 10. However, in a third modification, the positions where incident port 11 and outgoing ports 5a, 5b are disposed are not limited to first short side 10p.

In the first embodiment, the optical signal that is the polarization multiplexed signal generated from two optical signals that are the plurality of multilevel modulated signals is transmitted. However, in a fourth modification, the optical signal that is the multilevel modulated signal such as the quadrature phase shift keying and the quadrature amplitude modulation may be transmitted.

The effects of optical modulator 10 and optical transmission module 100 of the first embodiment will be described.

Optical modulator 10 of the first embodiment includes a plurality of Mach-Zehnder optical modulation units (for example, optical modulation units 13a, 13b). Each of the plurality of Mach-Zehnder optical modulation units includes the pair of arm waveguides (for example, arm waveguides 15a, 16a, 15b, 16b) extending in the first direction (the horizontal direction, the x-direction), the pair of first signal wirings (for example, signal wirings 17a, 18a, 17b, 18b), the pair of first signal electrode pads (for example, electrode pads 32a, 33a, 32b, 33b), the pair of second signal electrode pads (for example, electrodes pads 34a, 35a, 34b, 35b), the pair of first ground wirings (for example, ground wirings 19a, 19b, 19c), the pair of first ground electrode pads (for example, electrode pads 36a, 36b, 36c), and the pair of second ground electrode pads (for example, electrode pads 37a, 37b, 37c). The plurality of Mach-Zehnder optical modulation units are arrayed in the second direction (the vertical direction, the y-direction) perpendicular to the first direction.

The pair of first signal wirings (for example, signal wirings 17a, 18a, 17b, 18b) includes the pair of first signal wiring portions (for example, first signal wiring portions 161, 166, 171, 176), the pair of second signal wiring portions (for example, second signal wiring portions 162, 167, 172, 177) connected to one ends of the pair of first signal wiring portions, and the pair of third signal wiring portions (for example, third signal wiring portions 163, 168, 173, 178) connected to the other ends of the pair of first signal wiring portions, respectively. The pair of first signal wiring portions are provided on the pair of arm waveguides, and extend in the first direction. The pair of second signal wiring portions extends from one ends of the pair of first signal wiring portions so as to separate gradually in the second direction (y-direction) from the center line in the second direction of each of the plurality of Mach-Zehnder optical modulation units with distance from the pair of first signal wiring portions in the first direction (the x-direction) increases. The pair of third signal wiring portions extends from the other ends of the pair of first signal wiring portions so as to separate gradually in the second direction (the y-direction) from the center line in the second direction (the y-direction) of each of the plurality of Mach-Zehnder optical modulation units with the distance from the pair of first signal wiring portions in the first direction (the x-direction) increases. The pair of first signal electrode pads (for example, electrode pads 32a, 33a, 32b, 33b) is connected to the pair of second signal wiring portions (for example, second signal wiring portions 162, 167, 172, 177), respectively. The pair of second signal electrode pads (for example, electrode pads 37a, 37b) is connected to the pair of third signal wiring portions (for example, third signal wiring portions 163, 168, 173, 178), respectively.

The pair of first ground wirings (for example, ground wirings 19a, 19b, 19c) extends in the first direction, is provided on both sides of the pair of first signal wirings in the second direction, and is opposed to the pair of first signal wirings. The pair of first ground electrode pads (for example, electrode pads 36a, 36b, 36c) is located close to the pair of first signal electrode pads (for example, electrode pads 32a, 33a, 32b, 33b), and connected to the pair of first ground wirings. The pair of second ground electrode pads (for example, the electrode pads 37a, 37b, 37c) is located close to the pair of second signal electrode pads (for example, electrode pads 34a, 35a, 34b, 35b), and connected to the pair of first ground wirings. The first signal electrode pads of the plurality of Mach-Zehnder optical modulation units are disposed on the first straight line (for example, straight line L1) extending in the second direction. The pair of first ground electrode pads is displaced in the first direction from the pair of first signal electrode pads, and separates from the pair of first signal electrode pads in the first direction. The pair of first ground electrode pads is displaced in the second direction by less than the first interval (pad pitch P1) from the pair of first signal electrode pads so as to separate from the center line of each of the plurality of Mach-Zehnder optical modulation units. The first interval is an interval in the second direction between the centers of the pair of first signal electrode pads.

Thus, in each of the plurality of Mach-Zehnder optical modulation units (for example, optical modulation units 13a, 13b), the pair of first ground electrode pads (for example, electrode pads 36a, 36b, 36c) is displaced in the second direction by less than the first distance from the pair of first signal electrode pads (for example, electrode pads 32a, 33a, 32b, 33b) so as to separate from the center line of each of the plurality of Mach-Zehnder optical modulation units. Consequently, the short sides (first short side 10p, second short side 10q) of optical modulator 10 can be shortened. Optical modulator 10 can be downsized.

The pair of second signal wiring portions (for example, second signal wiring portions 162, 167, 172, 177) extends from one ends of the pair of first signal wiring portions (for example, first signal wiring portions 161, 166, 171, 176) so as to gradually separate from the center line in the second direction (the y-direction) of each of the plurality of Mach-Zehnder optical modulation units with the distance from the pair of first signal wiring portions in the first direction (the x-direction) increases. The pair of third signal wiring portions (for example, the third signal wiring portions 163, 168, 173, 178) extends from the other ends of the pair of first signal wiring portions so as to separate gradually in the second direction (the y-direction) from the center line in the second direction (the y-direction) of each of the plurality of Mach-Zehnder optical modulation units with the distance from the pair of first signal wiring portions in the first direction (the x-direction) increases. Consequently, the return loss of the electric signal decreases in the first signal wiring (for example, signal wirings 17a, 18a, 17b, 18b). Consequently, the frequency response characteristic of the electric signal is improved in optical modulator 10.

In optical modulator 10 of the first embodiment, the first signal electrode pads of the plurality of Mach-Zehnder optical modulation units are arrayed at the first intervals in the second direction. The first ground electrode pads (for example, electrode pads 36a, 36b) more than half the total number of the first ground electrode pads (for example, electrode pads 36a, 36b, 36c) of the plurality of Mach-Zehnder optical modulation units extend in the second direction, and are arrayed at a second intervals on the second straight line (for example, straight line L3) different from the first straight line (for example, straight line L1). The first interval is smaller than the second interval. Consequently, optical modulator 10 can be downsized.

In optical modulator 10 of the first embodiment, the pair of first ground electrode pads (for example, electrode pads 36a, 36b, 36c) is displaced by half the first interval in the second direction from the pair of first signal electrode pads (for example, electrode pads 32a, 33a, 32b, 33b). Consequently, optical modulator 10 can be downsized.

In optical modulator 10 of the first embodiment, the pair of second ground electrode pads (for example, electrode pads 37a, 37b, 37c) is opposed to the pair of first signal wirings (for example, signal wirings 17a, 18a, 17b, 18b). Consequently, optical modulator 10 can be downsized. The differential coplanar line is formed by the pair of first signal wirings and the pair of second ground electrode pads. Consequently, the frequency response characteristic of the electric signal is improved in optical modulator 10.

Optical transmission module 100 of the first embodiment includes optical modulator 10, wiring board 40, and the plurality of bumps 80. Wiring board 40 includes a plurality of third signal electrode pads (for example, electrode pads 41a, 42a, 41b, 42b), a plurality of third ground electrode pads (for example, electrode pads 43a, 43b, 43c), and a plurality of second signal wirings (for example, signal wiring 44a, 45a, 44b, 45b), at least one second ground wirings (for example, ground wiring 46a, 46b, 46c), a plurality of fourth signal electrode pads (for example, electrodes pads 47a, 48a, 47b, 48b), and a plurality of fourth ground electrode pads (for example, electrode pads 49a, 49b, 49c). The plurality of third signal electrode pads are opposed to the first signal electrode pads (for example, electrode pads 32a, 33a, 32b, 33b) of the plurality of Mach-Zehnder optical modulation units. The plurality of third ground electrode pads are opposed to the first ground electrode pads (for example, electrode pads 36a, 36b, 36c) of the plurality of Mach-Zehnder optical modulation units. One ends of the plurality of second signal wirings are electrically connected to the plurality of third signal electrode pads. The other ends of the plurality of second signal wirings are electrically connected to the plurality of fourth signal electrode pads. At least one ends of at least one second ground wirings is electrically connected to the plurality of third ground electrode pads. At least the other ends of at least one second ground wirings is electrically connected to the plurality of fourth ground electrode pads.

The plurality of bumps 80 connect first signal electrode pads (for example, electrode pads 32a, 33a, 32b, 33b) of the plurality of Mach-Zehnder optical modulation units and the plurality of third signal electrode pads (for example, electrode pads 41a, 42a, 41b, 42b) to each other, and connect first ground electrode pads (for example, electrode pads 36a, 36b, 36c) of the plurality of Mach-Zehnder optical modulation units and the plurality of third ground electrode pads (for example, electrode pads 43a, 43b, 43c) to each other. The first signal electrode pads of the plurality of Mach-Zehnder optical modulation units and the plurality of third signal electrode pads are opposed to at least one of the first ground wirings (for example, ground wirings 19a, 19b, 19c) of the plurality of Mach-Zehnder optical modulation units and at least one second ground wiring (for example, ground wirings 46a, 46b, 46c).

Optical modulator 10 can be downsized, so that optical transmission module 100 can also be downsized. Because the frequency response characteristic of the electric signal is improved in optical modulator 10, the frequency response characteristic of the electric signal is also improved in optical transmission module 100. Furthermore, the first signal electrode pads of the plurality of Mach-Zehnder optical modulation units and the plurality of third signal electrode pads form the differential coplanar line together with the first ground wirings (for example, ground wirings 19a, 19b, 19c) of the plurality of Mach-Zehnder optical modulation units or at least one second ground wiring (for example, ground wiring 46a, 46b, 46c). Consequently, the frequency response characteristic of the electric signal is improved in optical transmission module 100.

In optical transmission module 100 of the first embodiment, a part of first signal wiring (for example, signal wirings 17a, 18a, 17b, 18b) of the plurality of Mach-Zehnder optical modulation units and the first signal electrode pads (for example, electrode pads 32a, 33a, 32b, 33b) are opposed to a part of at least one second ground wirings (for example, ground wirings 46a, 46b, 46c). Consequently, a part of the first signal wirings (for example, the signal wiring 17a, 18a, 17b, 18b) of the plurality of Mach-Zehnder optical modulation units and the first signal electrode pads (for example, electrode pads 32a, 33a, 32b, 33b) form the differential coplanar line together with a part of at least one second ground wiring (for example, ground wirings 46a, 46b, 46c). The frequency response characteristic of the electric signal is improved in optical transmission module 100.

In optical transmission module 100 of the first embodiment, a part of the plurality of second signal wirings (for example, signal wirings 44a, 45a, 44b, 45b) and the plurality of third signal electrode pads (for example, electrode pads 41a, 42a, 41b, 42b) are opposed to a part of the first ground wirings (for example, ground wirings 19a, 19b, 19c) of the plurality of Mach-Zehnder optical modulation units. Consequently, a part of the plurality of second signal wirings (for example, signal wirings 44a, 45a, 44b, 45b) and the plurality of third signal electrode pads (for example, electrode pads 41a, 42a, 41b, 42b) form the differential coplanar line together with a part of the first ground wiring (for example, ground wirings 19a, 19b, 19c) of the plurality of Mach-Zehnder optical modulation units. The frequency response characteristic of the electric signal is improved in optical transmission module 100.

In optical transmission module 100 of the second embodiment, at least one second ground wiring is the plurality of second ground wirings (for example, ground wirings 46a, 46b, 46c). The plurality of third signal electrode pads (for example, electrode pads 41a, 42a, 41b, 42b), the plurality of third ground electrode pads (for example, electrode pads 43a, 43b, 43c), the plurality of second signal wiring (for example, signal wirings 44a, 45a, 44b, 45b), the plurality of second ground wirings, the plurality of fourth signal electrode pads (for example, electrode pads 47a, 48a, 47b, 48b), and the plurality of fourth ground electrode pads (for example, electrode pads 49a, 49b, 49c) are provided on the lower surface of wiring board 40 facing optical modulator 10. The plurality of second signal wirings (for example, signal wirings 44a, 45a, 44b, 45b) extend in the first direction. The plurality of second ground wirings are opposed to the plurality of second signal wirings. Consequently, the frequency response characteristic of the electric signal is improved in optical transmission module 100.

Second Embodiment

Referring to FIGS. 6 to 10, an optical modulator 10a and an optical transmission module 200 according to a second embodiment will be described. In the reference numerals of the members in the second embodiment are made by adding 100 to the numerals of the corresponding member numbers in the first embodiment.

Optical modulator 10a and optical transmission module 200 of the second embodiment are mainly different from optical modulator 10 and optical transmission module 100 of the first embodiment in the following points. In optical transmission module 200, a driver IC 30a is electrically connected to a wiring board 40a and wiring board 66 by wire bonding. Wiring board 40a of the second embodiment is different from wiring board 40 of the first embodiment in the configuration. Optical transmission module 200 further includes a wiring board 98. Optical modulator 10a includes a CW laser 20a and phase adjusters 210a to 210h, 212a to 212d.

Figure 6:
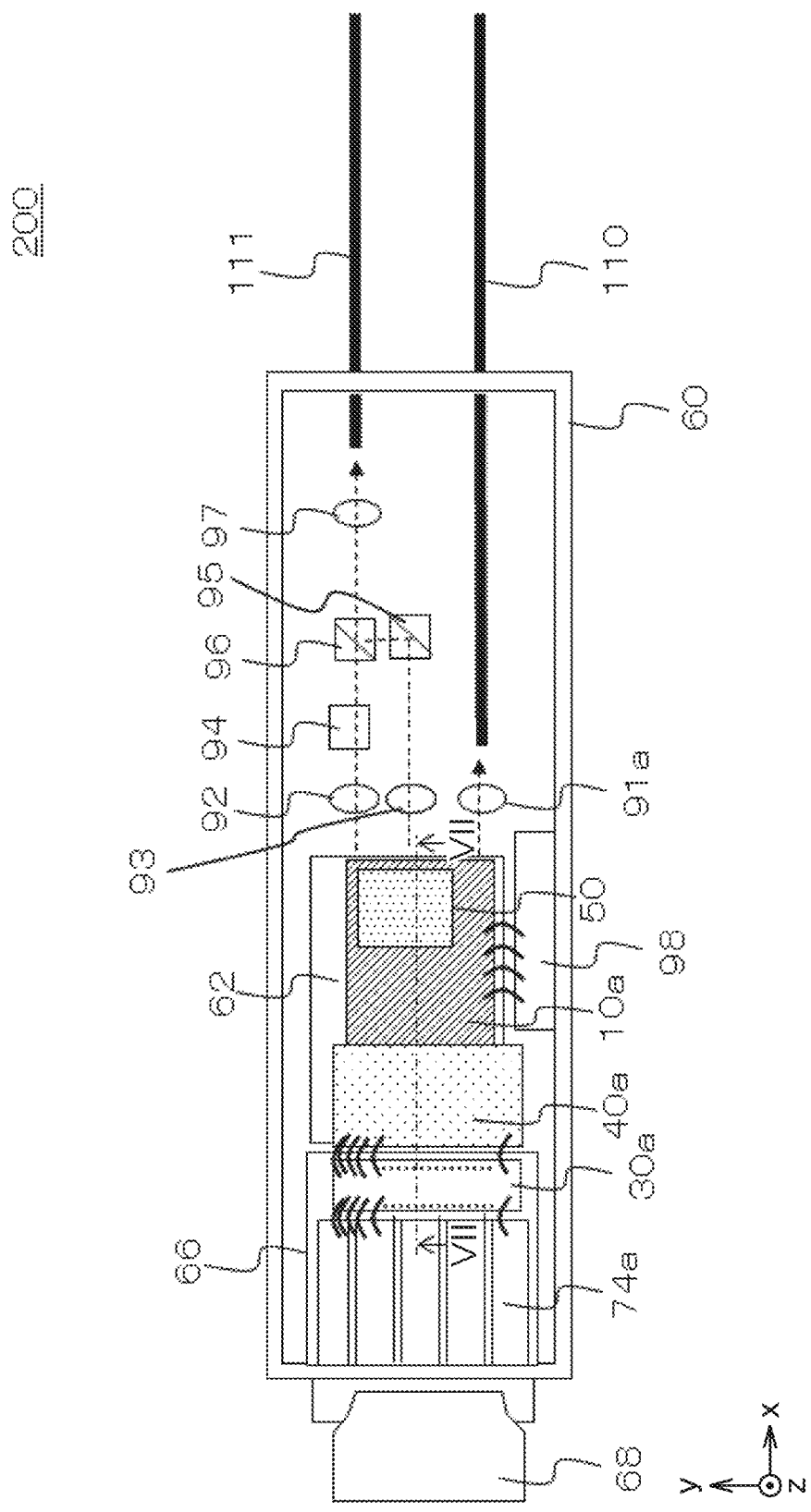
FIG. 6 is a schematic plan view illustrating an optical transmission module according to a second embodiment.
Figure 7:
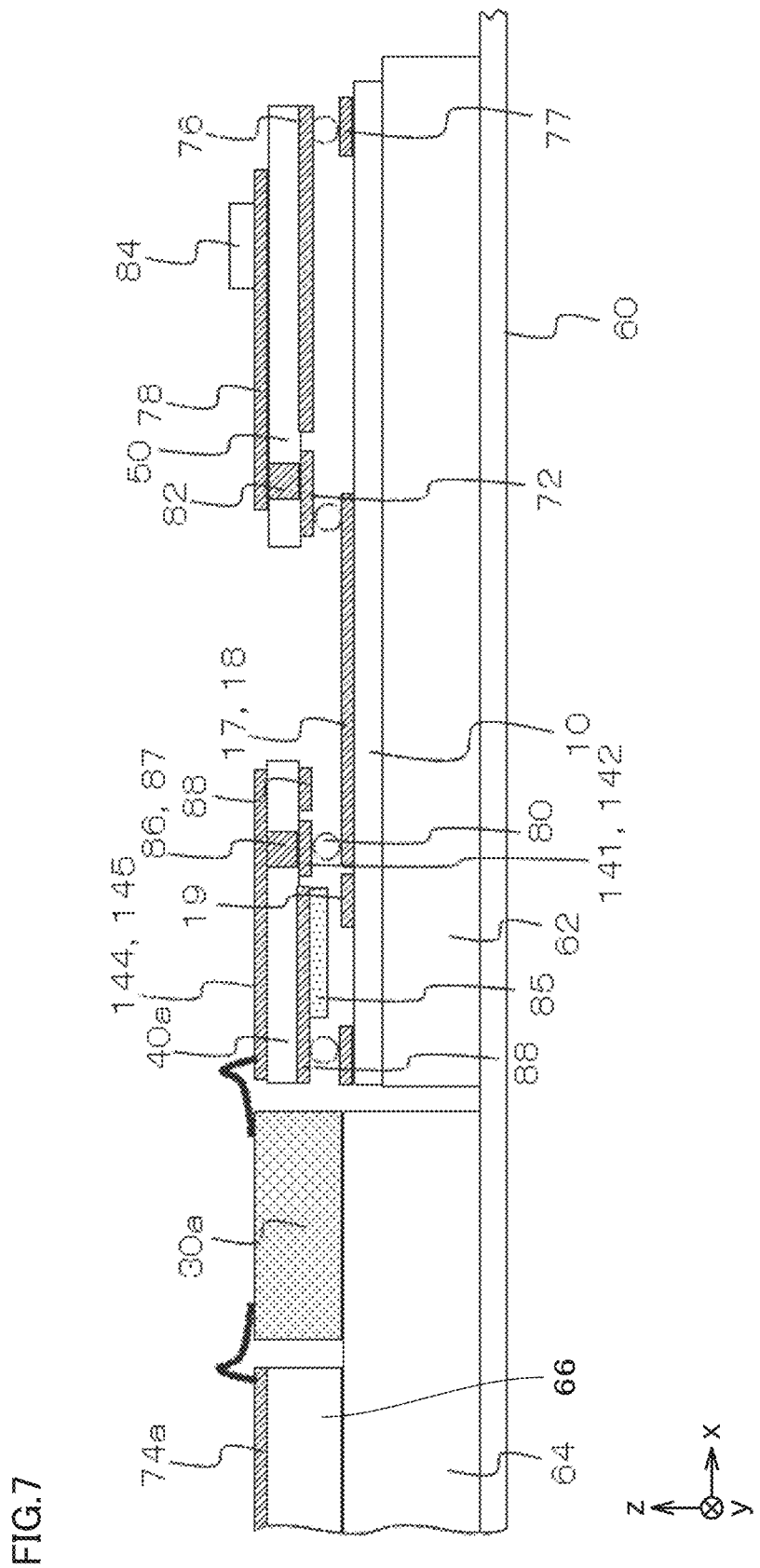
FIG. 7 is a schematic partially enlarged sectional view illustrating the optical transmission module of the second embodiment, taken along line VII-VII in FIG. 6.

As illustrated in FIGS. 6 and 7, optical transmission module 200 mainly includes driver IC 30a, wiring board 40a, optical modulator 10a, and wiring board 98.

Driver IC 30a and wiring board 66 are mounted on field through 64. Driver IC 30a is electrically connected to wiring board 66 by wire bonding. Specifically, driver IC 30a is electrically connected to a wiring 74a provided on the upper surface of wiring board 66 by wire bonding. Wiring 74a is electrically connected to a wiring (not illustrated) provided on flexible board 68. A control signal is input from flexible board 68 to driver IC 30a.

Driver IC 30a is electrically connected to wiring board 40a by wire bonding. Specifically, driver IC 30a is electrically connected to signal wirings 144, 145 provided on the upper surface of wiring board 40a by wire bonding. Wiring board 98 is electrically connected to optical modulator 10a, CW laser 20a, and phase adjusters 210a to 210h, 212a to 212d by wire bonding.

Figure 8:
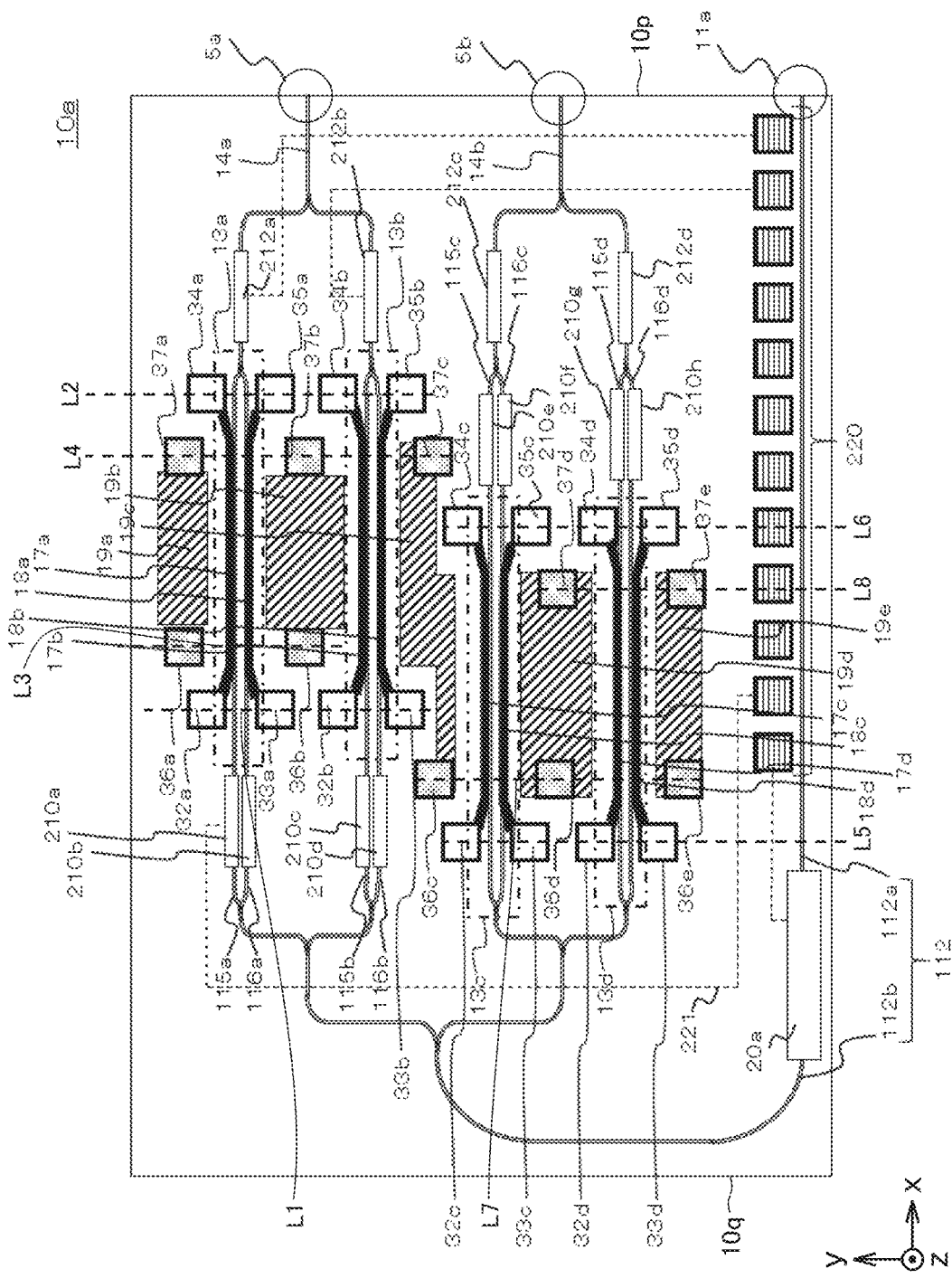
FIG. 8 is a schematic plan view illustrating an optical modulator of the second embodiment.

Referring to FIG. 8, optical modulator 10a will be described in detail.

Optical modulator 10a further includes CW laser 20a, phase adjusters 210a to 210h, phase adjusters 212a to 212d, and an electrode pad 220.

CW laser 20a is integrated in optical modulator 10a. CW laser 20a is provided in an optical waveguide 112. For example, CW laser 20a is a semiconductor laser. Optical waveguide 112 includes an output optical waveguide 112a and an input optical waveguide 112b. CW laser 20a can emit the CW light in the left and right directions in FIG. 8. CW light emitted rightward is propagated through output optical waveguide 112a, and emitted from an outgoing port 11a. The CW light emitted leftward is propagated through input optical waveguide 112b as the optical signal, and input to arm waveguides 115a to 115d, 116a to 116d.

Phase adjusters 210a to 210h are provided in arm waveguides 115a to 115d, 116a to 116d, respectively. Phase adjusters 210a to 210h, 212a to 212d are provided at four positions of output optical waveguides 14a, 14b corresponding to optical modulation units 13a to 13d. Phase adjusters 210a to 210h, 212a to 212d can change the phase of the optical signal passing through each optical waveguide according to the control signal applied to phase adjusters 210a to 210h, 212a to 212d. Phase adjusters 210a to 210h can adjust the phase difference generated between arm waveguides 115a to 115d, 116a to 116d. Phase adjusters 212a to 212d can adjust the phase difference generated between optical modulation units 13a to 13d.

Electrode pad 220 includes a plurality of electrode pads. Electrode pads 220 are arrayed along output optical waveguide 112a extending in a long-side direction of optical modulator 10a. Electrode pad 220 is electrically connected to CW laser 20a and phase adjusters 210a to 210h, 212a to 212d by a signal wiring 221. The control signal is input to electrode pad 220 to control CW laser 20a and phase adjusters 210a to 210h, 212a to 212d. The control signal input to electrode pad 220 is input to CW laser 20a and phase adjusters 210a to 210h, 212a to 212d through signal wiring 221. Signal wiring 221 between phase adjusters 210b to 210h, 212c, 212d and electrode pad 220 is not illustrated in FIG. 8.

Figure 9:
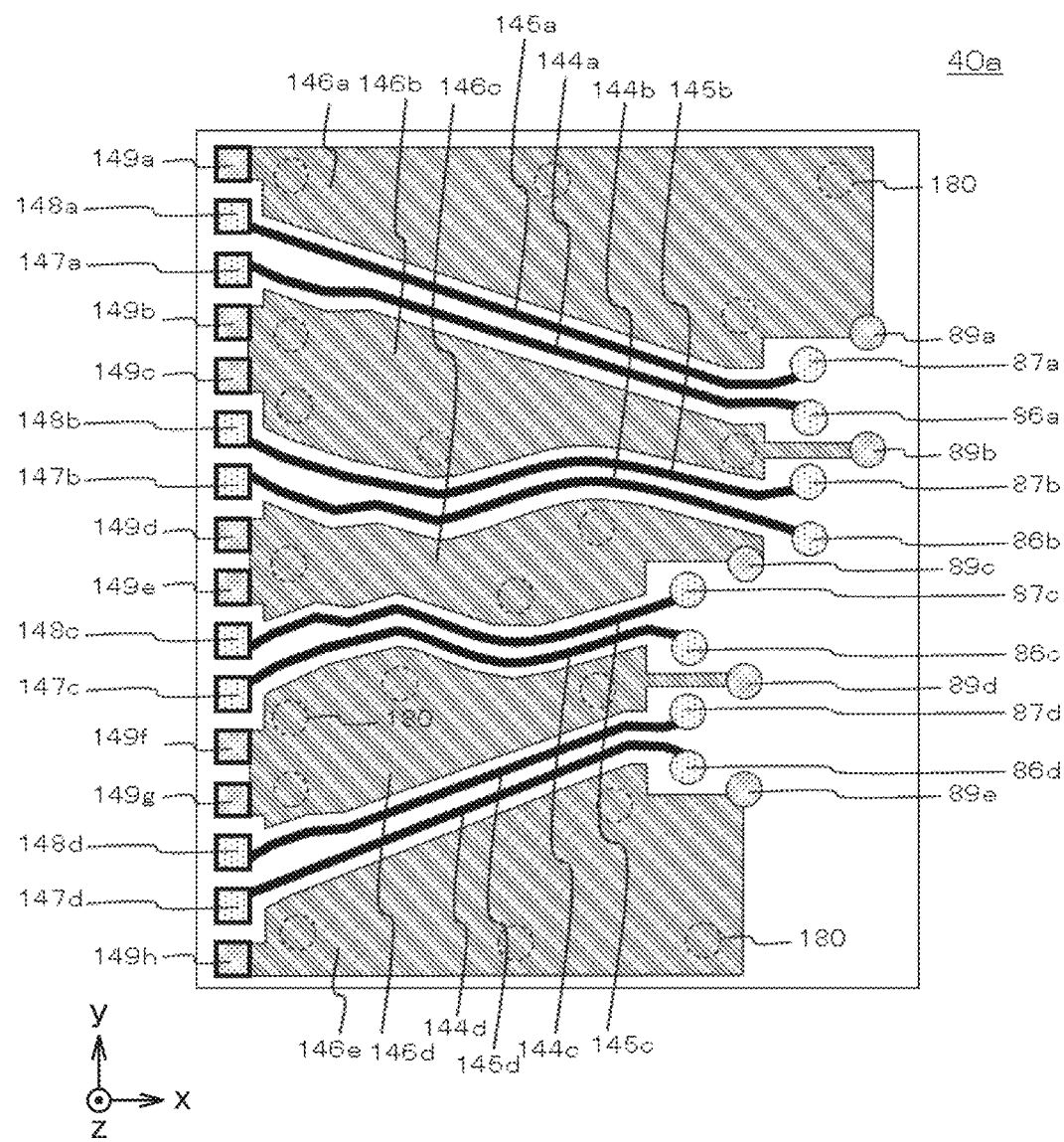
FIG. 9 is a schematic enlarged plan view illustrating a wiring board in the optical transmission module of the second embodiment.
Figure 10:
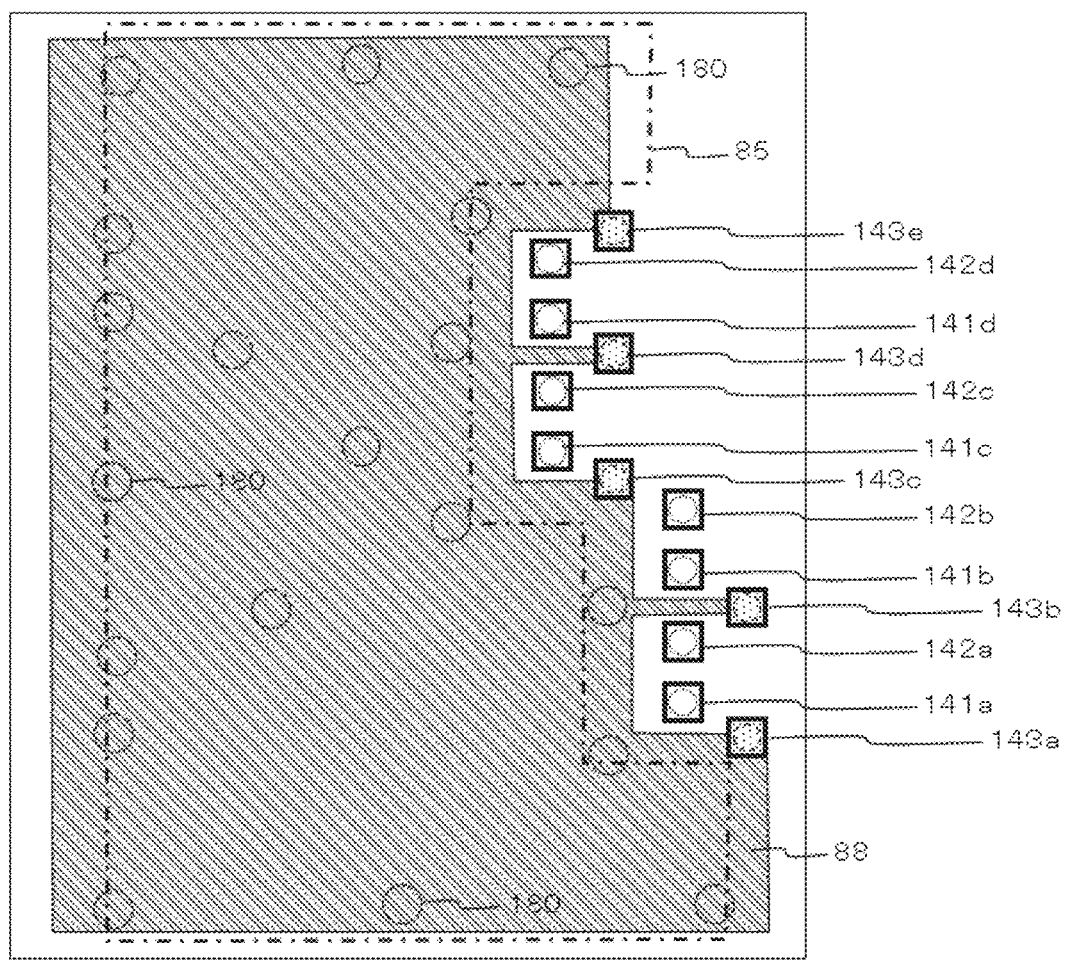
FIG. 10 is a schematic enlarged bottom view illustrating the wiring board in the optical transmission module of the second embodiment.

Referring to FIGS. 9 and 10, wiring board 40a will be described in detail.

As illustrated in FIG. 9, wiring board 40a includes signal wirings 144a to 144d, 145a to 145d and ground wirings 146a to 146e. Signal wirings 144a to 144d, 145a to 145d and ground wirings 146a to 146e are provided on the upper surface of wiring board 40a. The upper surface of wiring board 40a is located on the opposite side to the lower surface of wiring board 40a facing an optical modulator 10b.

Signal wirings 144a to 144d, 145a to 145d are provided such that signal wirings 144a to 144d, 145a to 145d electrically connected to the corresponding pair of arm waveguides 115a to 115d, 116a to 116d are opposed to each other. Signal wirings 144a to 144d, 145a to 145d are formed such that the signal wiring closer to the center of wiring board 40a is more largely curved. Consequently, signal wirings 144a to 144d, 145a to 145d have the same wiring length. In this way, the skew difference of the control signal input from driver IC 30a can be equalized between signal wirings 144a to 144d, 145a to 145d.

Ground wirings 146a to 146e extend along signal wirings 144a to 144d, 145a to 145d. Ground wirings 146a to 146e are opposed to corresponding signal wirings 144a to 144d, 145a to 145d. Ground wirings 146a to 146e are disposed on both sides of corresponding signal wirings 144a to 144d, 145a to 145d, respectively. Consequently, the differential coplanar line is formed by signal wirings 144a to 144d, 145a to 145d and ground wirings 146a to 146e. The loss due to the impedance matching can be prevented when the high-frequency differential signal having the characteristic impedance is input to the signal wiring. In order to make electrode pads 149a to 149h correspond to electrode pads 143a to 143e, a part of electrode pads 149b to 149g shares ground wirings 146b to 146d, and electrically connects ground wirings 146b to 146d to via electrodes 89b to 89d.

As illustrated in FIG. 9, wiring board 40a includes electrode pads 147a to 147d, 148a to 148d, 149a to 149h. Electrode pads 147a to 147d, 148a to 148d, 149a to 149h are provided on the upper surface of wiring board 40a. Electrode pads 147a to 147d, 148a to 148d, 149a to 149h are electrically connected to driver IC 30a by wire bonding. Electrode pads 147a to 147d, 148a to 148d are connected to one ends of signal wirings 144a to 144d, 145a to 145d, respectively. Electrode pads 149a to 149h are connected to one ends of the ground wirings 146a to 146e, respectively.

As illustrated in FIG. 10, wiring board 40a further includes electrode pads 141a to 141d, 142a to 142d, 143a to 143e, a ground wiring 88, and an insulating coating 85. Electrode pads 141a to 141d, 142a to 142d, 143a to 143e, ground wiring 88, and insulating coating 85 are provided on the lower surface of wiring board 40a facing optical modulator 10a. Electrode pads 141a to 141d, 142a to 142d, 143a to 143e are opposed to electrode pads 32a to 32d, 33a to 33d, 36a to 36e of optical modulator 10a.

As illustrated in FIG. 10, ground wiring 88 is provided on most of the lower surface of wiring board 40a except for regions where electrode pads 141a to 141d, 142a to 142d, 143a to 143e are provided. Ground wiring 88 is opposed to electrode pads 141a to 141d, 142a to 142d. Ground wiring 88 is connected to electrode pads 143a to 143e.

Insulating coating 85 is provided on ground wiring 88. Most of ground wiring 88 is covered with insulating coating 85. Insulating coating 85 is provided in a region other than the regions where electrode pads 141a to 141d, 142a to 142d, 143a to 143e are provided on ground wiring 88.

Wiring board 40a further includes via electrodes 86a to 86d, 87a to 87d, via electrodes 89a to 89e, and a via electrode 180. Via electrodes 86a to 86d, 87a to 87d, via electrodes 89a to 89e, and via electrode 180 penetrate wiring board 40a. Via electrodes 86a to 86d, 87a to 87d connect signal wirings 144a to 144d, 145a to 145d and electrode pads 141a to 141d, 142a to 142d to each other. Via electrodes 89a to 89e connect ground wiring 88 and electrode pads 143a to 143e to each other. Via electrode 180 connects ground wiring 88 and electrode pads 146a to 146e to each other.

The control signal output from driver IC 30a is input to electrode pads 147a to 147d, 148a to 148d, 149a to 149h. Consequently, electrode pads 147a to 147d, 148a to 148d, 149a to 149h are provided on the upper surface of wiring board 40a in the same number and the same disposition as output terminals of driver IC 30*a*. Electrode pads 147*a* to 147*d*, 148*a* to 148*d*, 149*a* to 149*h* are arrayed in a line along an edge side of wiring board 40*a* extending in the vertical direction (the second direction, the y-direction). Electrode pads 149*a* to 149*h* are provided according to the output terminals of driver IC 30*a*. Consequently, the number of electrode pads 149*a* to 149*h* is larger than the number of electrode pads 143*a* to 143*e* provided on the lower surface of wiring board 40*a*.

Because the number of electrode pads 149*a* to 149*h* is larger than the number of electrode pads 143*a* to 143*e*, at least two of electrode pads 149*a* to 149*h* are connected to one of ground wirings 146*a* to 146*e*. Specifically, electrode pads 149*b*, 149*c* are connected to ground wiring 146*b*. Electrode pads 149*d*, 149*e* are connected to ground wiring 146*c*. Electrode pads 149*f*, 149*g* are connected to ground wiring 146*d*.

A portion opposed to optical modulator 10*a* in ground wiring 88 of wiring board 40*a* is opposed to signal wirings 17*a* to 17*d*, 18*a* to 18*d* and electrode pads 32*a* to 32*d*, 33*a* to 33*d*. Consequently, the differential coplanar line is formed between signal wirings 17*a* to 17*d*, 18*a* to 18*d* and electrode pads 32*a* to 32*d*, 33*a* to 33*d* and ground wiring 88. The loss due to the impedance matching can be prevented when the high-frequency differential signal having the characteristic impedance is input to the signal wiring. That is, the differential coplanar lines are continuously formed over signal wirings 144*a* to 144*d*, 145*a* to 145*d* of wiring board 40*a*, bumps 80, and signal wirings 17*a* to 17*d*, 18*a* to 18*d* of optical modulator 10*a*.

Referring to FIGS. 6 and 8, the operation of optical modulator 10*a* and optical transmission module 200 will be described.

As illustrated in FIG. 8, CW laser 20*a* emits the CW light in the right and left directions. The CW light emitted rightward from CW laser 20*a* is propagated through output optical waveguide 112*a*, and is output from outgoing port 11*a*. The CW light is collected by lens 91*a*, and is incident on optical fiber 110. The CW light is output to the outside of optical transmission module 200 as local light for detecting the optical phase signal. The CW light emitted leftward from CW laser 20*a* is propagated through input optical waveguide 112*b* as the optical signal, and is input to each of optical modulation units 13*a* to 13*d* as the optical signal.

As illustrated in FIGS. 6 and 8, the four differential signals input from flexible board 68 are amplified and reshaped by driver IC 30*a*. These differential signals are input to electrode pads 32*a*, 32*b*, 33*a*, 33*b* of optical modulation units 13*a*, 13*b* through wiring board 40*a*. Similarly, other four differential signals are input to electrode pads 32*c*, 32*d*, 33*c*, 33*d* of optical modulation units 13*c*, 13*d*.

The optical signals input to optical modulation units 13*a* to 13*d* generate optical signals that are phase-modulated signals based on the differential signals. Specifically, optical modulation units 13*a*, 13*c* generate the optical signal that is the phase-modulated signal on which the I-phase component is superimposed. Optical modulation units 13*b*, 13*d* generate the optical signal that is the phase-modulated signal on which the Q-phase component is superimposed.

According to the control signal applied to phase adjusters 210*a* to 210*h*, phase adjusters 210*a* to 210*h* change the phase of the optical signal passing through each optical waveguide, and adjust the phase difference generated between arm waveguides 115*a* to 115*d*, 116*a* to 116*b*. According to the control signal applied to the phase adjusters 212*a* to 212*d*, phase adjusters 212*a* to 212*d* change the phase of the optical signal passing through each optical waveguide, and adjust the phase difference generated between optical modulation units 13*a* to 13*d*.

The differential signals input to optical modulation units 13*a* to 13*d* are propagated through signal wirings 17*a* to 17*d*, 18*a* to 18*d*, electrode pads 34*a* to 34*d*, 35*a* to 35*d*, signal wiring 72, via electrode 82, and signal wiring 78, and terminated by terminal resistor 84.

The optical signal that is the phase-modulated signal, which is generated by optical modulation unit 13*a* and on which the I-phase component is superimposed, and the optical signal that is the phase-modulated signal, which is generated by optical modulation unit 13*b* and on which the Q-phase component is superimposed, are multiplexed by output optical waveguide 14*a* to generate the optical signal that is the multilevel modulated signal such as the quadrature phase shift keying and the quadrature amplitude modulation. The optical signal, which is the multilevel modulated signal, is output from outgoing port 5*a* to the outside of optical modulator 10*a*. The optical signal that is the phase-modulated signal, which is generated by optical modulation unit 13*c* and on which the I-phase component is superimposed, and the optical signal that is the phase-modulated signal, which is generated by optical modulation unit 13*d* and on which the Q-phase component is superimposed, are multiplexed by output optical waveguide 14*b* to generate the optical signal that is the multilevel modulated signal such as the quadrature phase shift keying and the quadrature amplitude modulation. The optical signal, which is the multilevel modulated signal, is output from outgoing port 5*b* to the outside of optical modulator 10*a*.

The optical signal, which is the multilevel modulated signal output from outgoing port 5*a*, is shaped into parallel light by lens 92 as illustrated in FIG. 6. Wave plate 94 rotates the polarization of the optical signal by 90 degrees. Then, the optical signal is incident on polarization beam splitter 96. The optical signal, which is the multilevel modulated signal output from outgoing port 5*b*, is shaped into parallel light by lens 93, is reflected by mirror 95, and is incident on polarization beam splitter 96. The two optical signals, which are the two multilevel modulated signals incident on polarization beam splitter 96, are multiplexed by polarization beam splitter 96 to become the optical signal that is a polarization multiplexing signal. The optical signal is collected by lens 97, and is incident on optical fiber 111. The optical signal is output to the outside of optical transmission module 200.

Optical modulator 10*a* and optical transmission module 200 of the second embodiment have the same action and effect as optical modulator 10 and optical transmission module 100 of the first embodiment.

In the second embodiment, the portion opposed to optical modulator 10*a* in ground wiring 88 of wiring board 40*a* is opposed to signal wirings 17*a* to 17*d*, 18*a* to 18*d* and electrode pads 32*a* to 32*d*, 33*a* to 33*d*. The differential coplanar line is formed between signal wirings 17*a* to 17*d*, 18*a* to 18*d* and electrode pads 32*a* to 32*d*, 33*a* to 33*d* and ground wiring 88. Thus, the differential coplanar lines are continuously formed over signal wirings 144*a* to 144*d*, 145*a* to 145*d* of wiring board 40*a*, bumps 80, and signal wirings 17*a* to 17*d*, 18*a* to 18*d* of optical modulator 10*a*. Consequently, the loss due to the impedance matching can be prevented when the high-frequency differential signal having the characteristic impedance is input to the signal wiring. The frequency response characteristic of the electric signal can be improved in optical transmission module 200.

In wiring board 40a of optical transmission module 200 of the second embodiment, electrode pads 147a to 147d, 148a to 148d, 149a to 149h are provided in the same number and the same disposition as the output terminals of driver IC 30a. Electrode pads 147a to 147d, 148a to 148d, 149a to 149h are arrayed in a line on the edge side of the upper surface of wiring board 40a. Consequently, driver IC 30a can be disposed closer to wiring board 40a. The length of the bonding wire can be shortened. The degradation of the high-frequency response due to the wire bonding can be reduced in optical transmission module 200 of the second embodiment.

Electrode pads 147a to 147d, 148a to 148d, 149a to 149h of wiring board 40a are provided in the same number and the same disposition as the output terminals of driver IC 30a. Electrode pads 141a to 141d, 142a to 142d, 143a to 143e of wiring board 40a are provided in the same number and the same disposition as electrode pads 32a to 32d, 33a to 33d, 36a to 36e of optical modulator 10a. Electrode pads 141a to 141d, 142a to 142d, 143a to 143e are different from electrode pads 147a to 147d, 148a to 148d, 149a to 149h in the number and the disposition. Wiring board 40 converts the number and disposition of the electrode pads (electrode pads 147a to 147d, 148a to 148d, 149a to 149h) on the electrical signal input side into the number and disposition of the electrode pads (electrode pads 141a to 141d, 142a to 142d, 143a to 143e) on the electrical signal output side.

Consequently, a combination of driver IC 30a and optical modulator 10a can be changed only by changing the design of wiring board 40a (for example, by changing the numbers and dispositions of electrode pads 141a to 141d, 142a to 142d, 143a to 143e and electrode pads 147a to 147d, 148a to 148d, 149a to 149h) without changing the design of driver IC 30a and optical modulator 10a. A degree of design freedom of optical transmission module 200 can be increased.

CW laser 20a is built in optical modulator 10a. Necessity of optical axis adjustment between optical modulator 10a and CW laser 20a is eliminated to easily handle optical modulator 10a and CW laser 20a. It is not necessary to separately dispose optical modulator 10a and CW laser 20a in optical transmission module 200. Optical transmission module 200 can be downsized.

Optical modulator 10a includes phase adjusters 210a to 210h, 212a to 212d. Phase adjusters 210a to 210h, 212a to 212d can adjust the phase difference generated between arm waveguides 115a to 115d, 116a to 116b or between optical modulators 13a to 13d. Consequently, the frequency response characteristics of the input and output electric signals can be improved in optical modulator 10a and optical transmission module 200.

In optical transmission module 200, ground wiring 88 is provided on most of the lower surface of wiring board 40a. Consequently, interference of the differential signal between signal wiring 221 of phase adjusters 210a to 210h, 212a to 212d and signal wirings 144a to 144d, 145a to 145d of wiring board 40a can be prevented. The frequency response characteristics of the input and output electric signals can be improved in the optical transmission module 200.

In optical transmission module 200, insulating coating 85 is provided on the lower surface of wiring board 40a. Consequently, an electrical short circuit between ground wiring 88 and signal wirings 17a to 17d, 18a to 18d, 221 of optical modulator 10a due to erroneous contact between ground wiring 88 and signal wiring 17a to 17d, 18a to 18d, 221 can be prevented. High-reliability optical transmission module 200 can be provided.

In optical transmission module 200 of the second embodiment, as compared with optical transmission module 100 of the first embodiment, the skew difference of the input and output signals between the signal wirings can be decreased to improve the frequency response characteristics of the input and output electrical signals. Optical transmission module 200 of the second embodiment can further be downsized as compared with optical transmission module 100 of the first embodiment.

In optical transmission module 200 of the second embodiment, insulating coating 85 is provided on the lower surface of the wiring board 40a. Alternatively, the insulating coating may be provided on the lower surface of terminal board 50.

Optical modulator 10a and optical transmission module 200 of the second embodiment have the following effects in addition to the effects of optical modulator 10 and optical transmission module 100 of the first embodiment.

Optical modulator 10a of the second embodiment further includes the first optical waveguide (optical waveguide 112) connected to the arm waveguides (for example, arm waveguides 115a, 116a, 115b, 116b) of the plurality of Mach-Zehnder optical modulation units (for example, optical modulators 13a, 13b) and the laser (for example, CW laser 20a) provided in the first optical waveguide (optical waveguide 112). Consequently, the necessity of the optical axis adjustment between optical modulator 10a and CW laser 20a is eliminated to easily handle optical modulator 10a and CW laser 20a. Optical transmission module 200 can be downsized.

Optical modulator 10a of the second embodiment further includes the output optical waveguide (for example, the output optical waveguide 14a) connected to the arm waveguide (for example, arm waveguides 115a, 116a, 115b, 116b) of the plurality of Mach-Zehnder optical modulation units (for example, optical modulation units 13a, 13b) and the phase adjuster (for example, phase adjusters 210a, 210b, 210c, 210d, 212a, 212b) provided in at least one of the arm waveguide (for example, arm waveguides 115a, 116a, 115b, 116b) and the output optical waveguide. Consequently, the frequency response characteristics of the input and output electric signals can be improved in optical modulator 10a and optical transmission module 200.

In optical transmission module 200 of the second embodiment, wiring board 40a further includes a plurality of third ground wiring (ground wirings 146a to 146e) and a plurality of via electrodes 82, 86a to 86d, 87a to 87d, 89a to 89e, 180. At least one second ground wirings (ground wiring 88) is one second ground wiring (ground wiring 88). The second ground wiring (ground wiring 88), the plurality of third signal electrode pads (electrode pads 141a to 141d, 142a to 142d), and the plurality of third ground electrode pads (electrode pads 143a to 143e) are provided on the lower surface of wiring board 40a facing optical modulator 10a. The plurality of second signal wirings (signal wirings 144a to 144d, 145a to 145d), the plurality of third ground wirings (ground wirings 146a to 146e), the plurality of fourth signal electrode pads (electrode pads 147a to 147d, 148a to 148d), and the plurality of fourth ground electrode pads (electrode pads 149a to 149h) are provided on the upper surface of wiring board 40a, which is located on the opposite side to the lower surface of wiring board 40a.

The plurality of third ground wirings (ground wirings 146a to 146e) extend along the plurality of second signal wirings (signal wirings 144a to 144d, 145a to 145d), and are opposed to the second signal wirings (signal wirings 144a to 144d, 145a to 145d). The plurality of via electrodes 82, 86a to 86d, 87a to 87d, 89a to 89e, 180 connect the plurality of second signal wirings (signal wirings 144a to 144d, 145a to 145d) and the plurality of third signal electrode pads (electrode pads 141a to 141d, 142a to 142d) to each other, connect the second ground wiring (ground wiring 88) and the plurality of third ground electrode pads (electrode pads 143a to 143e) to each other, and connect the second ground wiring (ground wiring 88) and the plurality of third ground wirings (ground wirings 146a to 146e) to each other.

In this way, while the second ground wiring (ground wiring 88), the plurality of third signal electrode pads (electrode pads 141a to 141d, 142a to 142d), and the plurality of third ground electrode pads (electrode pads 143a to 143e) are provided on the lower surface of wiring board 40a, the plurality of second signal wirings (signal wirings 144a to 144d, 145a to 145d), the plurality of third ground wirings (ground wirings 146a to 146e), the plurality of fourth signal electrode pads (electrode pads 147a to 147d, 148a to 148d), and the plurality of fourth ground electrode pads (electrode pads 149a to 149h) are provided on the upper surface of wiring board 40a. Consequently, wiring board 40a can easily electrically be connected to optical modulator 10a and driver IC 30a. The electric signal is supplied to optical modulator 10a not from the bonding wire, but from wiring board 40a. Consequently, the frequency response characteristic of the electric signal can be improved in optical transmission module 200.

The differential coplanar line can be formed between signal wirings 17a to 17d, 18a to 18d and electrode pads 32a to 32d, 33a to 33d and the second ground wiring (ground wiring 88). The frequency response characteristics of the electric signal can be improved in optical modulator 10a and optical transmission module 200.

In optical transmission module 200 of the second embodiment, wiring board 40a further includes insulating coating 85 provided on the second ground wiring (ground wiring 88). Consequently, the electrical short circuit between ground wiring 88 and signal wirings 17a to 17d, 18a to 18d of optical modulator 10a due to the erroneous contact between ground wiring 88 and signal wirings 17a to 17d, 18a to 18d can be prevented. High-reliability optical transmission module 200 can be provided.

Optical transmission module 200 of the second embodiment further includes driver IC 30a electrically connected to wiring board 40a. The plurality of fourth signal electrode pads (electrode pads 147a to 147d, 148a to 148d) and the plurality of fourth ground electrode pads (electrode pads 149a to 149h) are arrayed along the edge side of wiring board 40a. The dispositions of the plurality of fourth signal electrode pads (electrode pads 147a to 147d, 148a to 148d) and the plurality of fourth ground electrode pads (electrode pads 149a to 149h) are identical to the dispositions of the plurality of fourth signal electrode pads (electrode pads 147a to 147d, 148a to 148d) and the plurality of electrode pads of the driver IC electrically connected to the plurality of fourth ground electrode pads (electrode pads 149a to 149h).

Consequently, wiring board 40a can easily electrically be connected to driver IC 30a. The length of the bonding wire can be shortened between optical modulator 10a and driver IC 30a. The frequency response characteristic of the electric signal can be improved in optical transmission module 200.

In optical transmission module 200 of the second embodiment, the number of the plurality of fourth ground electrode pads (electrode pads 149a to 149h) is larger than the number of the plurality of third ground electrode pads (electrode pads 143a to 143e). At least two of the plurality of fourth ground electrode pads (electrode pads 149a to 149h) are connected to one of the plurality of third ground wirings (ground wirings 146a to 146e).

In this way, wiring board 40a converts the number of terminals on the electric signal input side (for example, electrode pads 149a to 149h) into the number of terminals on the electric signal output side (for example, electrode pads 143a to 143e). Consequently, driver IC 30a and optical modulator 10a can electrically be connected to each other using wiring board 40a without changing the design of driver IC 30a and optical modulator 10a. A degree of design freedom of optical transmission module 200 can be increased.

Third Embodiment

Figure 11:
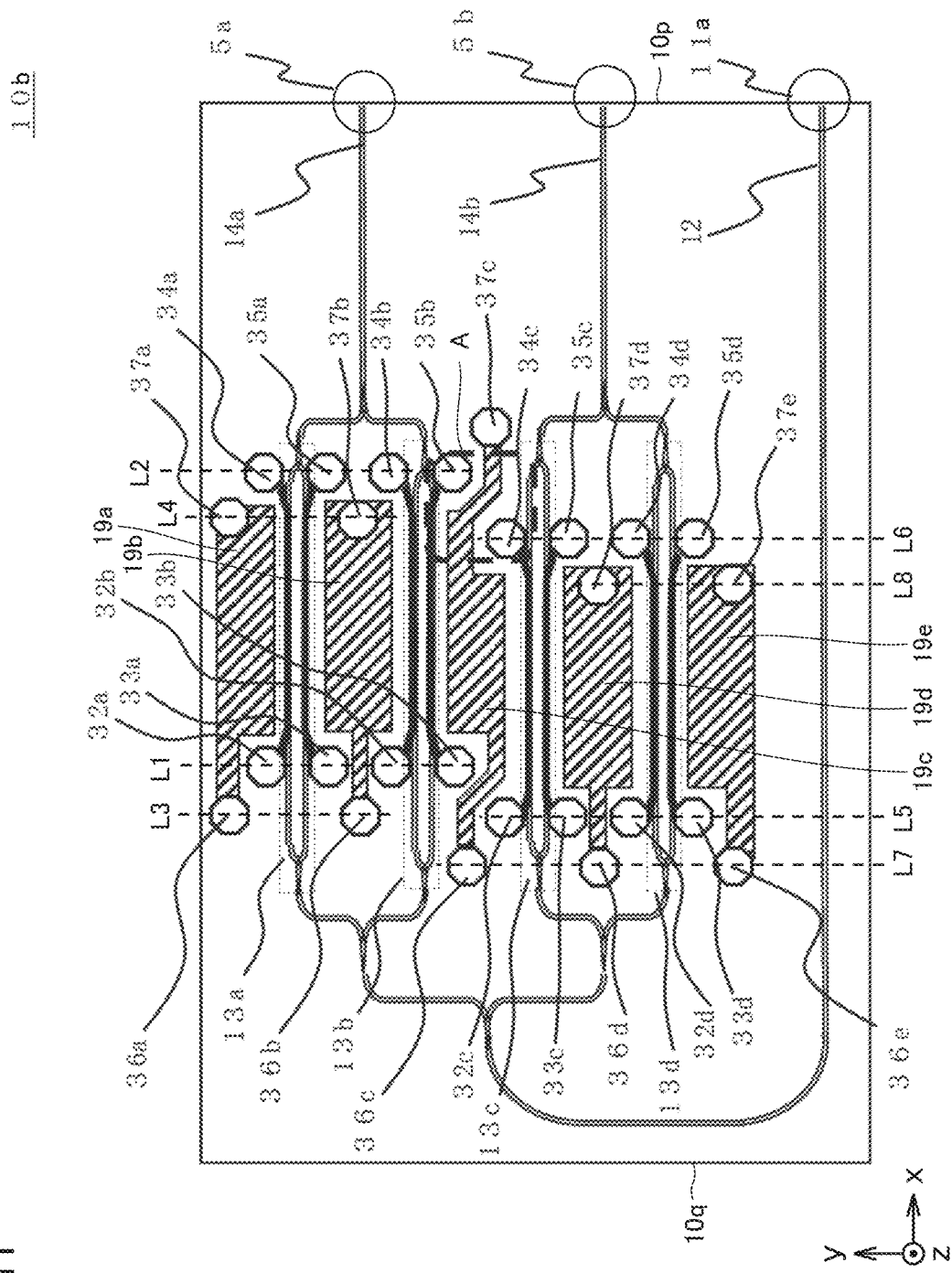
FIG. 11 is a schematic plan view illustrating an optical modulator according to a third embodiment.

Referring to FIG. 11, an optical modulator 10b according to a third embodiment will be described. Optical modulator 10b of the third embodiment has the same configuration as optical modulator 10 of the first embodiment, but is mainly different from optical modulator 10 in the following point. Optical modulator 10b is different from optical modulator 10 in the shapes of electrode pads 32a to 32d, 33a to 33d, 34a to 34b, 35a to 35b and electrode pads 36a to 36e, 37a to 37e. Optical modulator 10b is different from optical modulator 10 in the dispositions of electrode pads 36a to 36e, 37c and the shapes of ground wirings 19a to 19e.

In the third embodiment, electrode pads 32a to 32d, 33a to 33d, 34a to 34b, 35a to 35b and electrode pads 36a to 36e, 37a to 37e have a polygonal shape, such as a regular hexagon or a regular octagon, which has at least six sides, or a circular shape. Electrode pads 32a to 32d, 33a to 33d, 34a to 34b, 35a to 35b and electrode pads 36a to 36e, 37a to 37e of the third embodiment are not angular as compared with electrode pads 32a to 32d, 33a to 33d, 34a to 34b, 35a to 35b and electrode pads 36a to 36e, 37a to 37e of the first embodiment. Consequently, electrode pads 32a to 32d, 33a to 33d, 34a to 34b, 35a to 35b and electrode pads 36a to 36e, 37a to 37e can be provided with higher density. Optical modulator 10b can be downsized.

The distance between electrode pads 32a to 32d, 33a to 33d, 34a to 34b, 35a to 35b, 36a to 36e, 37a to 37e increases, so that ground wirings 19a to 19e can easily be provided between electrode pads 32a to 32d, 33a to 33d, 34a to 34b, 35a to 35b, 36a to 36e, 37a to 37e. For example, the distance between the electrode pads 32c, 33b increases, so that ground wiring 19c can easily be provided between electrode pads 32c, 33b. As illustrated in an area A of FIG. 11, the distance between the electrode pads 34c, 35b increases, so that ground wiring 19c can easily be provided between electrode pads 34c, 35b. In optical modulator 10b, the degree of design freedom of ground wirings 19a to 19e can be enhanced.

In the third embodiment, electrode pads 36a to 36e are provided closer to second short side 10q of optical modulator 10 than electrode pads 32a to 32d, 33a to 33d. Electrode pad 37c is provided closer to second short side 10q of optical modulator 10 than electrode pad 35c. The shapes of ground wirings 19a to 19e are changed according to the disposition of electrode pads 36a to 36e, 37c.

In the third embodiment, a part of the plurality of electrode pads 32a to 32d, 33a to 33d is opposed to a part of ground wirings 19a to 19e. Specifically, ground wiring 19a is opposed to electrode pad 32a. Ground wiring 19b is opposed to electrode pads 32b, 33a. Ground wiring 19c is opposed to electrode pads 32c, 33b. Ground wiring 19d is opposed to electrode pads 32d, 33c. Ground wiring 19e is opposed to electrode pad 33d. Consequently, the frequency response characteristic of the electric signal is improved in optical modulator 10b.

In the third embodiment, a part of the plurality of electrode pads 34a to 34d, 35a to 35d is opposed to a part of ground wirings 19a to 19e. Specifically, ground wiring 19c is opposed to electrode pads 34c, 35b. Consequently, the frequency response characteristic of the electric signal is improved in optical modulator 10b.

The optical transmission module of the third embodiment has the same configuration as optical transmission module 100 of the first embodiment, but is mainly different in that optical modulator 10b is provided instead of optical modulator 10. In the optical transmission module of the third embodiment, the electrode pad of the wiring board may have a polygonal shape, such as a regular hexagon and a regular octagon, which includes at least six sides, or a circular shape. Consequently, the wiring board can be downsized. In addition to the effects of optical transmission module 100 of the first embodiment, the optical transmission module of the third embodiment has the effect that the optical transmission module can further be downsized.

In addition to the effects of optical modulator 10 of the first embodiment, optical modulator 10b of the third embodiment has the following effect.

In optical modulator 10b of the third embodiment, each of the first signal electrode pads (electrode pads 32a to 32d, 33a to 33d) and each of the first ground electrode pads (electrode pads 36a to 36e) of the plurality of Mach-Zehnder optical modulation units has a polygonal shape including at least six sides or a circular shape. Consequently, the first signal electrode pad and the first ground electrode pad can be provided with higher density. Optical modulator 10b can be downsized.

It should be considered that the disclosed first to third embodiments and the modifications of these embodiments are examples in all respects and not restrictive. As long as there is no contradiction, at least two of the disclosed first to third embodiments and the modifications of these embodiments may be combined. For example, as in the third embodiment, the electrode pad of the second embodiment may have a polygonal shape including at least six sides or a circular shape. The scope of the present invention is defined by not the above description but the claims, and it is intended that all modifications within the meaning and scope of the claims are included in the present invention.

REFERENCE SIGNS LIST 5a, 5b, 11a outgoing port; 10, 10a, 10b optical modulator; 10p first short side; 10q second short side; 11 incident port; 12, 112b input optical waveguide; 12a, 14a, 14b, 112a output optical waveguide; 13a to 13d optical modulation unit; 15a to 15d, 16a to 16d, 115a to 115d, 116a to 116d arm waveguide; 17a to 17d, 18a to 18d, 44a to 44d, 45a to 45d, 72, 78, 144a to 144d, 145a to 145d, 221 signal wiring; 19a to 19e, 46a to 46e, 75, 76, 77, 88, 146a to 146e ground wiring; 20, 20a CW laser; 32a to 32d, 33a to 33d, 34a to 34d, 35a to 35d, 36a to 36e, 37a to 37e, 41a to 41d, 42a to 42d, 43a to 43e, 47a to 47d, 48a to 48d, 49a to 49e electrode pad; 40, 40a wiring board; 50 terminal board; 60 package; 62 chip carrier; 64 field through; 66 wiring board; 68 flexible board; 73, 74, 74a wiring; 80 bump; 82, 86a to 86d, 87a to 87d, 89a to 89e, 180 via electrode; 84 terminal resistor; 85 insulating coating; 90, 91, 91a, 92, 93, 97 lens; 94 wave plate; 95 mirror; 96 polarization beam splitter; 98 wiring board; 100, 200 optical transmission module; 110, 111 optical fiber; 112 optical waveguide; 161, 166, 171, 176, 181, 186, 191, 196 first signal wiring portion; 162, 167, 172, 177, 182, 187, 192, 197 second signal wiring portion; 163, 168, 173, 178, 183, 188, 193, 198 third signal wiring portion; 210a to 210h, 212a to 212d phase adjuster.

The invention claimed is:

1. An optical modulator comprising a plurality of Mach-Zehnder optical modulators,
wherein each of the plurality of Mach-Zehnder optical modulators includes a pair of arm waveguides extending in a first direction, a pair of first signal wirings, a pair of first signal electrode pads, a pair of second signal electrode pads, a pair of first ground wirings, a pair of first ground electrode pads, and a pair of second ground electrode pads,
the plurality of Mach-Zehnder optical modulators are arrayed in a second direction perpendicular to the first direction,
each of the pair of first signal wirings includes a pair of first signal wiring portions, a pair of second signal wiring portions connected to first ends of the pair of first signal wiring portions, and a pair of third signal wiring portions connected to second ends of the pair of first signal wiring portions,
the pair of first signal wiring portions is provided on the pair of arm waveguides, and extends in the first direction,
the pair of second signal wiring portions extends from the one ends of the pair of first signal wiring portions so as to separate gradually in the second direction from a center line in the second direction of each of the plurality of Mach-Zehnder optical modulators with a first distance from the pair of first signal wiring portions in the first direction increases,
the pair of third signal wiring portions extends from the other ends of the pair of first signal wiring portions so as to separate gradually in the second direction from the center line of each of the plurality of Mach-Zehnder optical modulators with a second distance from the pair of first signal wiring portions in the first direction increases,
the pair of first signal electrode pads is connected to the pair of second signal wiring portions,
the pair of second signal electrode pads is connected to the pair of third signal wiring portions,
the pair of first ground wirings extends in the first direction, provided on both sides of the pair of first signal wirings in the second direction, and opposed to the pair of first signal wirings,
the pair of first ground electrode pads is located close to the pair of first signal electrode pads, and connected to the pair of first ground wirings,
the pair of second ground electrode pads is located close to the pair of second signal electrode pads, and connected to the pair of first ground wirings,
the first signal electrode pads of the plurality of Mach-Zehnder optical modulators are disposed on a first straight line extending in the second direction,
the pair of first ground electrode pads is displaced in the first direction from the pair of first signal electrode pads, and separates from the pair of first signal electrode pads in the first direction,
the pair of first ground electrode pads is displaced in the second direction by less than a first interval from the pair of first signal electrode pads so as to separate from the center line of each of the plurality of Mach-Zehnder optical modulators, and the first interval is an interval in the second direction between centers of the pair of first signal electrode pads.

2. The optical modulator according to claim 1, wherein
the first signal electrode pads of the plurality of Mach-Zehnder optical modulators are arrayed at the first interval in the second direction,
the first ground electrode pads more than half of a total number of the first ground electrode pads of the plurality of Mach-Zehnder optical modulators extend in the second direction, and are arrayed at a second interval on a second straight line different from the first straight line, and
the first interval is smaller than the second interval.

3. The optical modulator according to claim 1, wherein the pair of first ground electrode pads is displaced by a half the first interval in the second direction from the pair of first signal electrode pads.

4. The optical modulator according to claim 1, wherein the pair of second ground electrode pads is opposed to the pair of first signal wirings.

5. The optical modulator according to claim 1, wherein each of the first signal electrode pads and each of the first ground electrode pads of the plurality of Mach-Zehnder optical modulators has a polygonal shape including at least six sides or a circular shape.

6. The optical modulator according to claim 1, further comprising:
a first optical waveguide connected to the arm waveguides of the plurality of Mach-Zehnder optical modulators; and
a laser provided in the first optical waveguide.

7. The optical modulator according to claim 1, further comprising:
an output optical waveguide connected to the arm waveguides of the plurality of Mach-Zehnder optical modulators; and
a phase adjuster provided in at least one of the arm waveguide and the output optical waveguide.

8. An optical transmission module comprising:
the optical modulator according to claim 1;
a wiring board; and
a plurality of bumps,
wherein the wiring board includes a plurality of third signal electrode pads, a plurality of third ground electrode pads, a plurality of second signal wirings, at least one second ground wiring, a plurality of fourth signal electrode pads, and a plurality of fourth ground electrode pads,
the plurality of third signal electrode pads are opposed to the first signal electrode pads of the plurality of Mach-Zehnder optical modulators,
the plurality of third ground electrode pads are opposed to the first ground electrode pads of the plurality of Mach-Zehnder optical modulators,
first ends of the plurality of second signal wirings are electrically connected to the plurality of third signal electrode pads,
second ends of the plurality of second signal wirings are electrically connected to the plurality of fourth signal electrode pads,
at least one end of the at least one second ground wirings is electrically connected to the plurality of third ground electrode pads,
at least the other end of the at least one second ground wirings is electrically connected to the plurality of fourth ground electrode pads,
the plurality of bumps connect the first signal electrode pads of the plurality of Mach-Zehnder optical modulators and the plurality of third signal electrode pads to each other, and connect the first ground electrode pads of the plurality of Mach-Zehnder optical modulators and the plurality of third ground electrode pads to each other, and
the first signal electrode pads of the plurality of Mach-Zehnder optical modulators and the plurality of third signal electrode pads are opposed to at least one of the first ground wirings of the plurality of Mach-Zehnder optical modulators and the at least one second ground wirings.

9. The optical transmission module according to claim 8, wherein a part of the first signal wiring and the first signal electrode pad of the plurality of Mach-Zehnder optical modulators are opposed to a part of the at least one second ground wirings.

10. The optical transmission module according to claim 8, wherein a part of the plurality of second signal wirings and the plurality of third signal electrode pads are opposed to a part of the first ground wirings of the plurality of Mach-Zehnder optical modulators.

11. The optical transmission module according to claim 8, wherein
the at least one second ground wiring is a plurality of second ground wirings,
the plurality of third signal electrode pads, the plurality of third ground electrode pads, the plurality of second signal wirings, the plurality of second ground wirings, the plurality of fourth signal electrode pads, and the plurality of fourth ground electrodes are provided on a lower surface of the wiring board facing the optical modulator,
the plurality of second signal wirings extend in the first direction, and
the plurality of second ground wirings are opposed to the plurality of second signal wirings.

12. The optical transmission module according to claim 8, wherein
the wiring board further includes a plurality of third ground wirings and a plurality of via electrodes,
said at least one second ground wirings is one second ground wiring,
the second ground wiring, the plurality of third signal electrode pads, and the plurality of third ground electrode pads are provided on a lower surface of the wiring board facing the optical modulator,
the plurality of second signal wirings, the plurality of third ground wirings, the plurality of fourth signal electrode pads, and the plurality of fourth ground electrode pads are provided on an upper surface of the wiring board on an opposite side to the lower surface of the wiring board,
the plurality of third ground wirings extend along the plurality of second signal wirings, and are opposed to the second signal wiring, and
the plurality of via electrodes connect the plurality of second signal wirings and the plurality of third signal electrode pads to each other, connect the second ground wirings and the plurality of third ground electrode pads to each other, and connect the second ground wiring and the plurality of third ground wirings to each other.

13. The optical transmission module according to claim 12, wherein the wiring board further includes an insulating coating provided on the second ground wiring.

14. The optical transmission module according to claim 12, further comprising a driver IC electrically connected to the wiring board, wherein the plurality of fourth signal electrode pads and the plurality of fourth ground electrode pads are arrayed along an edge side of the wiring board, and dispositions of the plurality of fourth signal electrode pads and the plurality of fourth ground electrode pads are identical to dispositions of a plurality of electrode pads of the driver IC electrically connected to the plurality of fourth signal electrode pads and the plurality of fourth ground electrode pads.

15. The optical transmission module according to claim 14, wherein a number of the plurality of fourth ground electrode pads is larger than a number of the plurality of third ground electrode pads, and at least two of the plurality of fourth ground electrode pads are connected to one of the plurality of third ground wirings.

\* \* \* \* \*